US009244455B2

(12) United States Patent
Peterson et al.

(10) Patent No.: US 9,244,455 B2
(45) Date of Patent: Jan. 26, 2016

(54) LOCATION DEPENDENT CONTROL ACCESS IN A PROCESS CONTROL SYSTEM

(75) Inventors: Neil J. Peterson, Austin, TX (US); Trevor D. Schleiss, Austin, TX (US)

(73) Assignee: FISHER-ROSEMOUNT SYSTEMS, INC., Round Rock, TX (US)

(*) Notice: Subject to any disclaimer, the term of this patent is extended or adjusted under 35 U.S.C. 154(b) by 868 days.

(21) Appl. No.: 12/205,457

(22) Filed: Sep. 5, 2008

(65) Prior Publication Data

US 2009/0065578 A1    Mar. 12, 2009

Related U.S. Application Data

(60) Provisional application No. 60/971,171, filed on Sep. 10, 2007.

(51) Int. Cl.
| | | |
|---|---|---|
| *G06K 5/00* | (2006.01) | |
| *G05B 19/048* | (2006.01) | |
| *G05B 19/409* | (2006.01) | |
| *G05B 19/418* | (2006.01) | |
| *G07C 9/00* | (2006.01) | |

(52) U.S. Cl.
CPC ............ *G05B 19/048* (2013.01); *G05B 19/409* (2013.01); *G05B 19/4185* (2013.01); *G07C 9/00111* (2013.01)

(58) Field of Classification Search
USPC .......................................... 235/382
See application file for complete search history.

(56) References Cited

U.S. PATENT DOCUMENTS

| 4,596,049 A | 6/1986 | Rizzotti, III |
| 4,908,746 A | 3/1990 | Vaughn |
| 5,309,351 A | 5/1994 | McCain et al. |
| 5,325,522 A | 6/1994 | Vaughn |
| 6,129,449 A | 10/2000 | McCain et al. |

(Continued)

FOREIGN PATENT DOCUMENTS

| CA | 2550812 | 12/2006 |
| EP | 0825506 A2 | 2/1998 |

(Continued)

OTHER PUBLICATIONS

European Search Report for Application No. 08163951, dated Jun. 8, 2009.

(Continued)

*Primary Examiner* — Rafferty Kelly
(74) *Attorney, Agent, or Firm* — Marshall, Gerstein & Borun LLP

(57) ABSTRACT

A method of accessing an element in a process control environment using a portable communicator includes defining a plurality of control areas within the process control environment, determining a position of a user operating a portable communicator with respect to one or more of the control areas, establishing an identity of the user, and selectively allowing the user to access an element within the process control environment via the portable communicator depending on the determined position of the user with respect to the one or more control areas and on the identity of the user.

54 Claims, 9 Drawing Sheets

(56) References Cited

U.S. PATENT DOCUMENTS

| | | |
|---|---|---|
| 6,266,612 B1 | 7/2001 | Dussell et al. |
| 6,330,482 B1 | 12/2001 | McCain et al. |
| 6,359,711 B1 | 3/2002 | Cole et al. |
| 6,507,762 B1 | 1/2003 | Amro et al. |
| 6,747,590 B1 | 6/2004 | Weber |
| 7,024,256 B2 | 4/2006 | Krzyzanowski et al. |
| 7,043,529 B1* | 5/2006 | Simonoff ............... 709/205 |
| 2003/0061295 A1* | 3/2003 | Oberg et al. ............ 709/208 |
| 2003/0171827 A1 | 9/2003 | Keyes et al. |
| 2004/0148039 A1 | 7/2004 | Farchmin et al. |
| 2004/0203874 A1* | 10/2004 | Brandt et al. ........... 455/456.1 |
| 2005/0021712 A1 | 1/2005 | Chassapis et al. |
| 2005/0038565 A1 | 2/2005 | Power et al. |
| 2005/0062677 A1 | 3/2005 | Nixon et al. |
| 2005/0164684 A1 | 7/2005 | Chen et al. |
| 2005/0185618 A1 | 8/2005 | Friday et al. |
| 2005/0222691 A1 | 10/2005 | Glas et al. |
| 2006/0075075 A1 | 4/2006 | Malinen et al. |
| 2006/0099971 A1 | 5/2006 | Staton et al. |
| 2006/0129640 A1 | 6/2006 | Farchmin et al. |
| 2006/0138224 A1 | 6/2006 | Azami et al. |
| 2007/0205861 A1 | 9/2007 | Nair et al. |

FOREIGN PATENT DOCUMENTS

| | | | |
|---|---|---|---|
| EP | 0 992 921 A2 | 4/2000 | |
| EP | 992921 A2 * | 4/2000 | ............ G06F 17/30 |
| EP | 1670191 A1 | 6/2006 | |
| GB | 2 353 180 | 2/2001 | |
| GB | 2449585 B | 3/2009 | |
| JP | 2011-065641 A | 3/1999 | |
| JP | 2002-354557 A | 12/2002 | |
| JP | 2003-108222 A | 4/2003 | |
| JP | 2007-058443 A | 3/2007 | |
| JP | 2007 221553 A | 8/2007 | |
| WO | WO-2004/029741 A2 | 4/2004 | |
| WO | WO-2008/088398 | 7/2008 | |

OTHER PUBLICATIONS

Search Report for Application No. GB0816469.1, dated Dec. 15, 2008.
Examination Report in Corresponding Great Britain Pat. App. No. GB0816469.1 dated Dec. 5, 2011.
Office Action for corresponding European Patent Application No. 08163951.0, dated Sep. 8, 2011.
Office Action for corresponding Chinese Patent Application No. 200810149541.5, dated Mar. 28, 2013.
Office Action for corresponding European Patent Application No. 08163951.0, dated Apr. 2, 2013.
Office Action for corresponding Japanese Patent Application No. 2008-231233, dated May 7, 2013.
Masakazu Miyamae et al, An Event-driven Navigation Platform for Wearable Computing Environments, *Information Processing Society of Japan Journal*, vol. 46, No. 3, pp. 694-703, Mar. 15, 2005 Abstract.
Office Action for corresponding Chinese Patent Application No. 200810149541.5, dated Sep. 11, 2012.
Examination Report in Corresponding Great Britain Pat. App. No. GB0816469.1 dated Oct. 1, 2012.
Combined Search and Examination Report in Corresponding Great Britain Pat. App. No. GB1215864.8 dated Oct. 1, 2012.
Office Action for corresponding Japanese Patent Application No. 2008-231233, dated Mar. 4, 2014.
Office Action for corresponding Chinese Patent Application No. 200810149541.5, dated Feb. 25, 2014.
Office Action for corresponding Chinese Patent Application No. 200810149541.5, dated Oct. 21, 2013.
Notice of Reexamination for corresponding Chinese Patent Application No. 200810149541.5, dated Jun. 1, 2015.
Notice of Reexamination for Chinese Patent Application 200810149541.5, dated Jun. 1, 2015.
Examination Report for GB1215864.8, dated Dec. 10, 2012.

* cited by examiner

LOCATION DEPENDENT CONTROL ACCESS IN A PROCESS CONTROL SYSTEM

CROSS REFERENCE TO RELATED APPLICATION

This application claims the benefit of U.S. Provisional Patent App. No. 60/971,171 entitled "Location Dependent Control Access in a Process Control System," filed Sep. 10, 2007, the disclosure of which is hereby expressly incorporated herein by reference.

FIELD OF THE INVENTION

The present invention relates generally to process control systems and, more particularly, to the use of portable devices within process control plants.

DESCRIPTION OF THE RELATED ART

Process control systems, like those used in chemical, petroleum or other process plants, generally include a centralized process controller that is communicatively coupled to at least one host or operator workstation and to one or more field devices via analog, digital or combined analog/digital buses. The field devices, which may be, for example valves, valve positioners, switches, sensors (e.g., temperature, pressure and flow rate sensors), etc., perform control functions within the process such as opening or closing valves and taking measurements of process parameters. Generally speaking, the process controller receives signals indicative of process measurements made by the field devices and/or other information pertaining to the field devices, uses this information to implement a control routine and then generates control signals which are sent over the buses to the field devices to control the operation of the process. Information from the field devices and the controller is typically made available to one or more applications that are executed by the operator workstation to enable an operator to perform any desired function with respect to the process, such as viewing the current state of the process, modifying the operation of the process, performing diagnostic activities, optimizing the process, managing process alerts or alarms, carrying out batch activities, etc.

While an operator or a technician can access a variety of types of information pertaining to the process control system and the individual devices therein (such as help, diagnostic, set-up and configuration information) using the host or operator workstation, there are many process control activities that require a technician to go out into the actual plant environment where no host or operator workstation is present. Such activities include, for example, visually inspecting a process control device or area, connecting devices or buses within the process control environment, taking manual measurements, troubleshooting, repairing and replacing field devices, etc. In these cases, the operator or technician may carry manuals pertaining to the function to be performed out into the plant and look up any needed information in the field. This process can be very cumbersome. More likely, the technician will return to the operator workstation one or more times to look up any information he or she may need during the course of the performing the desired activity, which is very time consuming and prone to error. Other times, the technician will carry a radio or walkie-talkie into the plant and communicate via the radio with an operator located at the operator workstation to get any process information such as current setpoint or operating value of a device. However, the amount of information that can be provided over the radio is time consuming, limited and is prone to errors because it is based on human communications. Furthermore, because the technician typically carries and operates the radio using his or her hands, the use of a radio makes performing certain functions, like repairing a device, much more cumbersome and difficult.

With the advent of smaller electronics, portable computers in the form of wearable and/or hand-held computers have become more readily available. A wearable and/or hand-held computer generally includes a standard central processing unit (CPU) and a memory packaged in a small container that may be placed within a pouch on a belt or harness worn by a user (also referred to herein as a "wearer") which is designed to make carrying the wearable computer as convenient as possible. In some cases, a hand-held computer such as, for example, a personal data assistant (PDA) may be hand carried, holstered in a belt or pouch, or otherwise worn by a user as needed or desired. By way of example, a user may holster (i.e., wear) a PDA while in transit to a particular location within a process plant and, upon arriving at that location, may remove the PDA from the holster and begin to use the PDA as a hand-held computer. Peripheral devices, such as disk drives, hard drives, PCMCIA slots, microphones, barcode readers and keyboard devices (communicating via wired or Bluetooth) may be communicatively coupled to the CPU via appropriate wires or buses and, if desired, one or more of these peripheral devices may be placed in or connected to the harness. Alternatively or additionally, one or more of these peripheral devices may be integrated within the portable computer (i.e., a hand-held and/or wearable computer), if desired. A wearable computer thereby provides portable computing power and memory to a user and, because a wearable computer is worn instead of carried by the user, the user's hands are only required to manipulate a keyboard or other input device. Of course, a hand-held computer such as, for example, a PDA may be conveniently carried to a location within a plant within a user worn pouch or the like, or may be carried by hand, if desired. A user may then holster the hand-held computer or set it down using an integral stand, if one is provided, to permit the use of both hands.

The use of a portable computer to provide enhanced support within a process control system is generally described in U.S. Patent Application Publication No. 2005-006277, "Portable Computer Device in a Process Control Environment" to Nixon et al., the entire disclosure of which is hereby incorporated by reference. Generally, a portable device may provide wireless communication access to devices or control loops in a process control system or a process plant, thereby either replacing stationary workstations disposed away from the devices or providing an additional method of communicating with the devices, databases, etc. within a process plant. Similar to a stationary workstation, a portable device may support a set of applications related to monitoring or configuring the process. Thus, an operator may perform some or all of the tasks previously available only at a stationary workstation location via the portable computer, in addition to being able to move through the process area, such as a plant or a manufacturing facility.

While portable devices provide operators and maintenance personnel of process control plants with many advantages, such as a possibility of approaching a particular part of the plant being worked on in order to personally or visually observe a problem or to visually confirm changes being made to the system, an operator or maintenance person may not always properly use a portable device to obtain these advantageous, which in some cases may lead to problems. For example, an operator is able to use a portable communication device to access and alter the configuration of field devices, control loops or other process equipment that are not within his or her proximity. In an easily recognizable scenario, an operator could configure part of a system while observing the devices being affected, leave the area, and then discover than some additional changes to the same part of the system are required. Understandably, the operator may not want to return to the same area in order to confirm the remaining changes visually and so may use the portable device to make changes when the operator is not within the section of the process plant affected by the changes. As will be understood, the probability of making a mistake in configuration is clearly higher when the operator is not observing the changes or the problem in person.

Another disadvantage potentially encountered by the use of portable devices in a process control system is that these devices increase the likelihood of errors due to ambiguity and/or confusion when dealing with similar devices (or similarly named devices) in the same system. For instance, a refinery may have several similar tanks storing fluids and several control loops each maintaining the pressure of fluid in the corresponding tank at some predetermined level. In case of failure, or when an adjustment to some set point or configuration parameter in one of the control loops is required, it is clearly important for an operator to correctly identify the particular control loop and the associated tank that requires attention. While control system designers typically try to assign descriptive names to various devices, loops, and signals in the software associated with the process control system, it is very difficult to assign names that completely eliminate potential confusion, especially in larger plants. This confusion can be increased when using portable communication devices which typically have small and harder to read display screens. Thus, in some circumstances, operators can physically approach an entity requiring attention in order to obtain a visual confirmation of the problem or of the changes being made, but still inadvertently make changes to other areas or sections of the process plant due to confusingly similar names and device tags, small and hard to read display screens, hard to use input devices on the portable communication devices, etc.

Moreover, the use of portable devices in process control systems further engenders a new type of a security problem. Whereas stationary workstations typically remain within a controlled area of a plant or on some dedicated premises where at least some level of security is provided, a portable device may be either stolen or simply carried outside a particular boundary or area of the plant by mistake. Therefore, there is a possibility that changes to the operation of the plant may be attempted from outside the plant or from an unauthorized user of the portable device.

Another problem is that of directing the attention of a human operator to automatically generated messages, such as process events and alarms. In the recent years, as real-time event notification via a plurality of different communication devices has became prevalent, human operators have grown used to machine-generated messages and these operators are known to ignore, or in a more typical scenario, postpone the handling of these messages. The operators may consequently fail to respond to an event notification on time or may even forget to respond to an event notification at all. In an easily recognizable scenario, an operator may be working on something important at his or her workstation when an alarm or event is pushed to the workstation. The workstation may indicate the new message arrival by flashing a tab on the task bar, emitting a sound, displaying a new window in the display foreground, etc. However, the operator may postpone handling of the event by minimizing the window, sending the window to tab to the background, or closing the window or tab completely. This scenario is particularly true in cases when operators work from a remote location and where these operators must put their current work on hold in order to walk or even drive over to the area in which the event has originated. While the use of portable devices may provide additional means of delivering notifications to operators or to maintenance personnel, it does little, if anything, to direct their attention to issues when required. In some respect, portable devices have so far only served to increase the "noise" level present in event reporting, as operators or maintenance personnel receive notifications both at the stationary workstations and their portable devices.

SUMMARY

A user operating a wireless portable (e.g., handheld or wearable) communication device which is used in a process control system to send and receive information related to various aspects of plant operation is granted access to the process plant equipment and to data pertaining to the process plant equipment based on the current physical location of the user. In some embodiments, the location of the user is determined by means of an electronic tag capable of radio-frequency identification (RFID). In other embodiments, the location of the user is associated with the location of the wireless portable communication device. In one embodiment, an access controller or server is disposed in the process plant to determine either the absolute geographic location of the portable device or tag a relative location or placement of the portable device or tag with respect to one or more signal sources or other devices within the process plant, and uses the location of the portable wireless communication device or tag to establish and enforce access rights that a user of the portable communication device may have. This access control system may, for example, limit the user of the portable communication device to being able to access only plant equipment or information about plant equipment within the area of the plant in which the user is currently located. In another aspect, the access control system may grant different access rights to users depending on both the level of authentication of the users and on the geographic location of the users. This access control system may thus prevent the user of the portable device from viewing or configuring entities outside the access control area associated with the location of the portable device so as to prevent the user from inadvertently making changes to the wrong equipment, to assure that the user is close to the plant equipment being configured and to provide some level of security with respect to a misplaced, stolen or lost portable device.

DETAILED DESCRIPTION OF THE DRAWINGS

DETAILED DESCRIPTION

Figure 1:
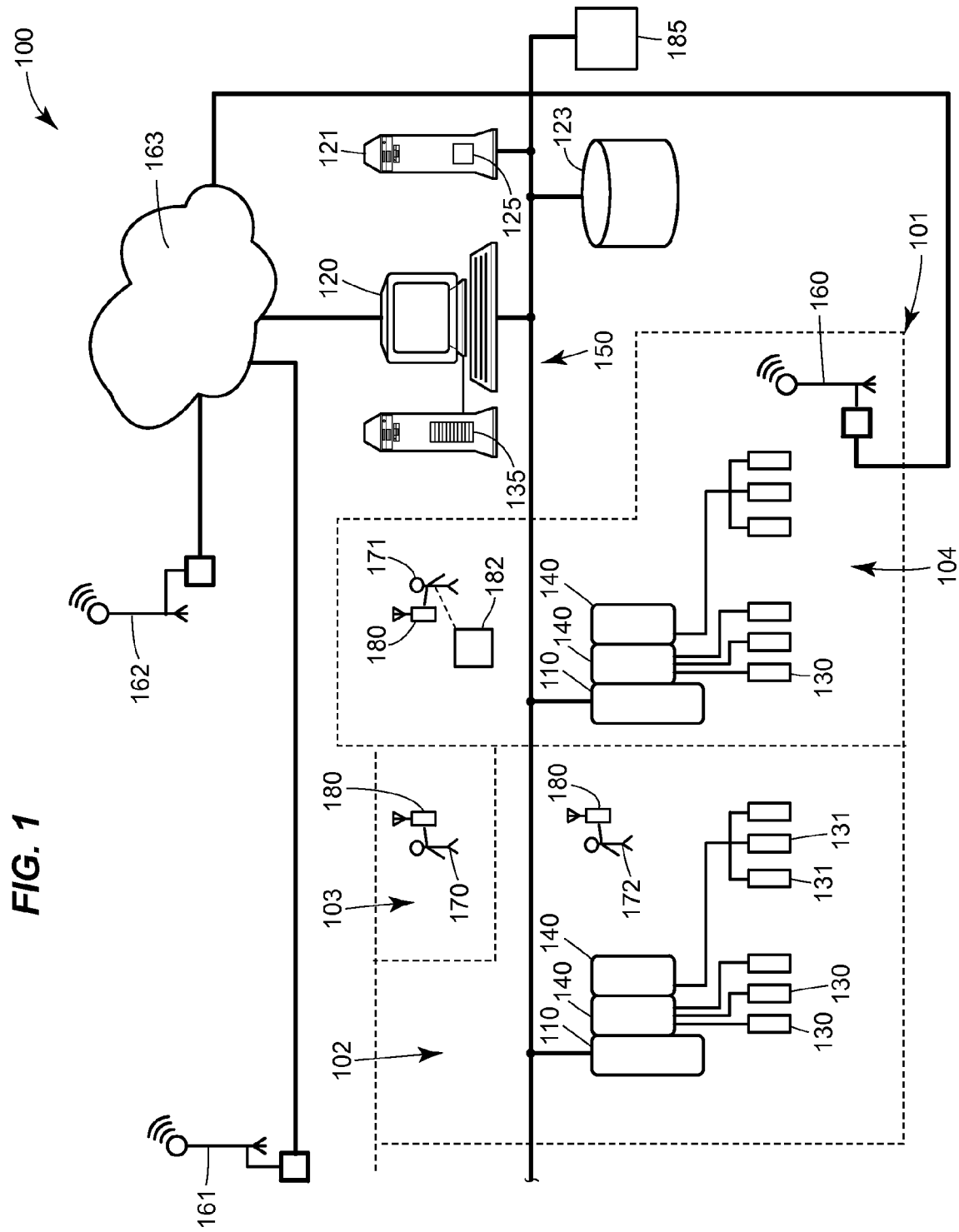
FIG. 1 is a block diagram of a process control system divided into several geographic areas and including several wireless access points and a location appliance.

FIG. 1 is a schematic representation of a process control system within a process plant in which portable devices are used to view, configure, and otherwise communicate with stationary elements of the plant, and in which access to various elements of the process control system is controlled based on the location of a user operating a particular portable device or of the portable device itself. More specifically, a process control system 100 within a process plant 101 is divided into several control areas and/or units 102-104. The process plant 101 includes one or more process controllers 110 communicatively connected to one or more host workstations or computers 120 (which may be any type of personal computers, workstations, etc.), some having a display screen. Additionally, an access server 121 may be communicatively connected to the one or more process controllers 110. Alternatively, the access server 121 and one of the workstations 120 may be implemented as an integral unit. A registry 125, maintaining run time data related to system components and system users, may reside in the access server 121 or in any other desired database. As illustrated in FIG. 1, the controllers 110 are connected to field devices 130 and 131 via input/output (I/O) cards 140. A data historian 135 may be any desired type of data collection unit having any desired type of memory and any desired or known software, hardware or firmware for storing data and may be separate from or a part of one of the workstations 120. The controllers 110, which may be, by way of example, DeltaV™ controllers sold by Emerson Process Management, are communicatively connected to the host computers 120 via, for example, an Ethernet connection or any other desired communication network 150. The communication network 150 may be in the form of a local area network (LAN), a wide area network (WAN), a telecommunications network, etc. and may be implemented using hardwired or wireless technology. Moreover, the controllers 110 may be communicatively connected to the field devices 130 and 131 using any desired hardware and software associated with, for example, standard 4-20 ma devices and/or any smart communication protocol such as the FOUNDATION Fieldbus protocol (Fieldbus), the HART protocol, etc.

The field devices 130 and 131 may be any types of devices, such as sensors, valves, transmitters, positioners, etc. while the I/O cards 140 may be any types of I/O devices conforming to any desired communication or controller protocol. In the embodiment illustrated in FIG. 1, the field devices 130 are standard 4-20 ma devices or HART devices that communicate over analog lines to the I/O card 140 while the field devices 131 are smart devices, such as Fieldbus field devices, that communicate over a digital bus to the I/O card 140 using Fieldbus protocol communications. Of course, the field devices 130 and 131 could conform to any other desired standard(s) or protocols, including any standards or protocols developed in the future.

The controllers 110 illustrated in FIG. 1, which may be only a few of many distributed controllers disposed within the plant 101, have at least one processor therein, and implement or oversee one or more process control routines, which may include control loops, stored therein or otherwise associated therewith. Each controller 110 also communicates with the field devices 130-131, the host computers 120 and the data historian 135 to control a process in any desired or known manner. It should be noted that any control routines or elements described herein may have parts thereof implemented or executed by different controllers or other devices if so desired. Likewise, the control routines or elements described herein to be implemented within the process control system 100 may take any form, including software, firmware, hardware, etc. For the purpose of this discussion, a process control element can be any part or portion of a process control system including, for example, a routine, a block or a module stored on any computer readable medium or may be a device (such as a field device, a controller, an I/O device, etc.), a unit, or other piece or collection of process equipment. Control routines, which may be made of one or more modules or any part of a control procedure such as a subroutine, parts of a subroutine (such as lines of code), etc. may be implemented in any desired software format, such as using ladder logic, sequential function charts, function block diagrams, object oriented programming or any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software/hardware/firmware programming or design tools. Thus, the controllers 110 may be configured to implement a control strategy or control routine in any desired manner.

The process control system 100 may also include one or wireless communication points 160-162 operatively coupled to a communication network 163. During operation of the plant 101, operators 170-172 may carry portable workstations, or portable communication devices 180 (which are preferably wireless communication devices) throughout the different sections or portions of the process plant 101 and use these devices for such purposes as supervising, configuring, troubleshooting, and otherwise maintaining the devices, units, control loops and other parts of the process plant 101. Operators may use the portable devices 180 to communicate with various system elements, such as the field device 131, via wireless access points 160-162 using, for example, one of the many IEEE Standard 802.11(x) protocols. These communications may be related to various aspects of operation of the plant, but typically these communications relate to a specific system element, such as a field device or a control loop. In most cases, the procedures carried out by the portable devices 180 are targeted operations that relate to a specific area of the process plant 101.

An operator may also carry an electronic tag 182 in order for the process control system 100 to automatically detect the operator's location within the plant 101. The electronic tag 182 may be an active RFID tag emitting low-power radio signals carrying substantially unique identification information. The signal from the electronic tag 182 may be transmitted either periodically or on demand when the electronic tag 182 reaches one of the predetermined locations. The signals emitted by the electronic tags 182 may be detected by one or more readers (not shown) placed in various locations within the plant 101. As one skilled in the art will recognize, active RFID tags may operate with one of the available Real Time Location Systems (RTLS) technologies. The active electronic tags 182 may be equipped with very small batteries which may last several years despite their size, depending on the interval at which the electronic tags 182 are configured to transmit signals.

In another embodiment, all or some of the electronic tags 182 may be passive REID tags working in cooperation with stationary devices, or "choke points" (not shown), which trigger the circuitry in the electronic tags 182. Upon "waking up," the circuitry within the passive electronic tags 182 may use part of the energy of the detected signal to transmit the tag identity. Because the passive electronic tags 182 do not require a battery, the passive approach to RFID tagging may be preferable in those situations where the configuration of the plant 101 or the nature of the process carried out by the plant 101 may tolerate a relatively less robust location service.

Further, passive or active electronic tags 182 may be used with other technologies available today or in the future. For example, the electronic tags 182 may rely on WiFi or WiMax RTLS. In those situations where the highest degree of precision is need, the electronic tags 182 may use Ultra-Wide-Band (UWB) RTLS. In any of these embodiments, operators may carry the electronic tags 182 on their clothing or in their wallets or, alternatively, the electronic tags 182 may be attached to the portable wireless devices 180. Of course, the firmware and the software associated with the electronic tags 182 may also be embedded in the portable devices 180 or, alternatively, supplied as a card compatible with one of the expansion slots of the portable device 180.

In yet another embodiment, operators and their personal portable devices 180 may be "coupled" by means of one or a pair of electronic tags 182. In particular, a certain portable device 180 may be configured to retain an association with a corresponding operator only for as long as the operator remains within a predefined distance from the portable device 180. Operators may use this approach as a security feature or as a preventive measure in order to avoid abuse of unsupervised equipment, for example. One skilled in the art will also appreciate that the operator/portable device association may be also implemented by means of Bluetooth, infrared, or other small signal technology.

The process plant 101 may be divided into any number of different control areas indicated as control areas 102-104 in FIG. 1. The division may correspond to or be related to the physical setup of the plant 101, and thus each control area may be based on or correspond to a separate room, floor, area, etc. of the plant 101. Alternatively, the boundaries between control areas may be virtual and may not be physically observable or based on physical separators within the plant 101. Thus, a single floor, area, room, etc. of a process plant may have multiple control areas therein. In one embodiment, the plant 101 is divided into a number of control areas based on the set of process equipment or devices within each corresponding geographic area. For example, a relatively small geographic area of the plant 101 containing a large number of devices may be divided into multiple control areas whereas a relatively large geographic area with a smaller number of devices or process equipment may correspond to a single control area. However, generally speaking, the control areas are set up to correspond to some predetermined physical control access paradigm defining the specific equipment to which an operator is to be given control based on the operator's location, and thus control areas need not be limited in physical size nor in the number of devices or amount of process equipment within a control area. Moreover, as is illustrated in FIG. 1, different control areas of a single plant may have different two-dimensional and three-dimensional shapes and may cover different amounts of physical space. Furthermore, it will be appreciated that while FIG. 1 depicts a two-dimensional disposition of control areas, control areas may also correspond to three-dimensional physical spaces. For example, a single control area may include several floors of a plant.

As indicated above, control areas need not conform to any particular geometric shape. FIG. 1 illustrates, for example, that control area 103 is rectangular while control areas 102 and 104 are polygons of various shapes. The boundaries of each control area may be delimited by a set of coordinates such as, for example, two or three dimensional coordinates for each of the vertices of a corresponding polygon. Alternatively, control areas may be defined as circles having a center associated with a coordinate and a radius or as any other shape. Geographic coordinates may be absolute coordinates associated with, for example, the Global Positioning Service (GPS) or relative coordinates defined by the technical staff associated with the plant and based on, for example, equipment or physical aspects of the plant. Thus, for example, relative coordinates may be defined in terms of proximity to a particular piece of plant equipment, proximity to a building, floor or other area of the plant, etc.

It will be appreciated that control areas may also be defined without the use of a coordinate system. For example, a control area may be defined as a region of space wherein the strength of a given signal, such as a radio signal carrying an identification signal unique to a plant area, is measured to be above a certain predetermined threshold. In another embodiment, a control area may be associated with one or more choke points with which RFID tags come into contact. However, it is preferred that, regardless of the specific technique for recording area boundaries, control areas correspond to at least some possibility of visual contact. Although in some cases this may not be possible, it may be desirable otherwise to define control areas so that a human observer can physically see the relevant entities while he or she is in the associated area. Moreover, while the control areas of FIG. 1 do not overlap, control areas may overlap in space so that, at some physical locations, a user may be in multiple control areas.

In one embodiment, it is contemplated that the definition of control areas takes place in a planned organized fashion so that the full efficiency of the method of controlling access to process equipment based on the location of the user is utilized. For instance, a designer may first consult the layout of the plant or of the facility where a process control system is implemented, as well as various schematics related to the operation of the process control system. The designer may then walk through the facility and mark areas by either recording their GPS coordinates or recording sample measurements from the wireless access points using the portable device 180. Depending on the degree of precision desired for the chosen implementation, the designer may instead simply attach transceivers or other signal emitters and detectors to various objects in the plant 101. The location and the corresponding association of these signal sources and/or detectors may be entered into the database to create a map of various different control areas for the plant 101. It may also be possible to use any GPS receiver, including commercially available GPS receivers, to create a relatively precise mapping of devices, control loops, and other units to one or more control areas. Alternatively, one of the known Local Positioning Techniques may be used as well. At this stage of the design process, the designer may or may not rely on any particular infrastructure elements of the process control system or of the plant 101.

Additionally, control areas need not be static and may fluctuate according to situations, such as malfunctions, which may be detected by the access server 121. For example, a software routine running on server 121 may expand a particular control area in response to some abnormal condition. In this respect, it may be desirable to store the relative positioning of control areas, such as a list of adjacent areas. In some cases, it may be advantageous to know that a "control area 1," for instance, is adjacent to "control areas 2, 3, and 7," while a "control area 10" is adjacent to control areas 4 and 6. If needed, this information may in turn be stored in any desired or known formats and may be used to expand or change control areas from time to time.

It will be further noted that control areas may overlap each other. For example, a certain field device may be legitimately associated with more than one control area. Alternatively, there may physical locations within or outside the plant that are not associated with any control area and these physical locations may or may not include process equipment. In FIG. 1, for example, control area 103 may correspond to a region either inside or outside of the process plant 101 where no access to any part of the process control system 100 should be granted to operators using potable devices 180.

The assignment or definition of control areas, which may be based on one of the possible approaches discussed above or based on any other desired approach, may be entered and stored in the database 123 which may be, for example, an SQL server/database. Though illustrated in FIG. 1 as being physically separate from the access server 121 and the workstation 120, one of ordinary skill in the art will appreciate that the database 123 may reside in the memory of either the server 121 or the workstation 120. Furthermore, one of ordinary skill in the art will recognize that both the server 121 and the workstation 120 may be implemented as a single server with a keyboard and a display unit. In addition to storing data related to at least one of the possible methods of defining geographic areas, the database 123 may also store other information related to the operation of the process control system 100, such as software routines running on the controllers 110 or 110, as well as the data related to each of the I/O devices 140 and field devices 130 and 131, configuration data for these devices, etc.

A location appliance 185 may store the definition of areas 102-104 in addition or as an alternative to the database 123. The location appliance 185 may store and manage a list of coordinates of the plant equipment such as field devices 130 and 131, the coordinates of the choke points, a map of the facility in which the process plant 101 resides, and other relevant geographic information. The location appliance 185 may be communicatively coupled to one or more wireless access points 160-162 via the network of the process plant 101, for example. The location appliance may assist the process control system 100 with locating the electronic tags 182 or the portable devices 180 equipped with the firmware and/or software equivalent to the electronic tags 182. In particular, the electronic tags 182 working in cooperation with one or more wireless access points 160-162 or the choke points of the process plant 101 may report signal measurements to the location appliance 185. The location appliance 185 may apply a mathematical algorithm to the reported measurements, generate a set of coordinates, and compare the coordinates to the stored definition of control areas 102-104 to arrive at a location of the user or portable device 180 relative to the defined control areas. In this sense, the location appliance 185 may serve as a centralized server responsible for carrying out location-related calculations. As discussed below, the location appliance 185 may be further adapted to ascertain the levels of access of a particular authorized user with respect to the devices of the process plant 101 based on the obtained relative position of the user.

The one or more wireless access points (WAPs) 160-162 may be installed in different locations of the plant 101 or outside of the plant 101 if so desired. In one embodiment, at least three WAPs are disposed to be in a sufficiently close proximity to any location within the process plant 101. While FIG. 1 illustrates the WAP 160 inside the area 104, no mapping between the control areas and the WAPs, either in number or in location, is strictly necessary. Moreover, while it is possible to provide one WAP in each of the control areas defined for a plant, it is not strictly necessary to do so in all embodiments. In any event, the WAPs 160-162 may be operatively connected to the network 163, which may be a Local Area Network (LAN) or a Wide Area Network (WAN). Furthermore, the network 163 may be a secure network accessible by personnel associated with the plant only or it may be a Wide Area Network operatively coupled to the communication network 150. The connection between each of the WAPs 160-162 and the network 163 may be made or implemented using any type of network connection known in the art, such as Ethernet, for example or any other type of network connection.

Generally speaking, the wireless access points 160-162 operate to provide wireless communications between operators 170-172 carrying portable devices 180 and/or electronic tags 182 and the process control system 100. As discussed in greater detail below, the portable devices 180 may be equipped with a transceiver and may be supplied with the corresponding software to support one of the many wireless protocols. By means of communicating with one of the WAPs 160-162, the portable devices 180 establish a network connection with the process control system 100 in order to allow operators 170-172 to communicate with one or more elements of the process control system. For instance, operators may communicate with the server 121, with the workstation 120, or with the database 123. Additionally, operators may be able to directly communicate with one of the controllers 110, or with one of the field devices 130 or 131 via the respective controllers 110 and I/O cards 140. In one embodiment, operators carrying portable devices 180 may have access to one or more of the applications that are available at the workstation 120 or may run such applications and have access to the same data made available to the workstation 120.

According to the embodiment illustrated in FIG. 1, the wireless access points 160-162 may be used for both allowing communication between the portable devices 180 and the network 150 and for ascertaining the physical location of a portable device 180. In one possible embodiment, the portable devices 180 may measure or receive search signals from one or more of the WAPs 160-162 and send measurement reports to the location appliance 185. Software running on the location appliance 185 may then determine the location of the portable device 180 based on, for example, a triangulation of the signals, the strength of the signals, etc., and may register the determined location in the memory of the server 121, in the database 123, or in any other desired location. The calculated location may also be reported to the portable device 180 performing the measurement reports. Preferably, there are at least three WAPs 160-162 in sufficient proximity to an operator carrying a portable device 180, so as to allow proper triangulation and, therefore, to yield a better calculation of the location. However, the location may be still be approximately determined if the number of WAPs being used to determine a location is less than three. For example, the portable device 180 may send measurement reports associated with two or even one signal source, and the location determination system implemented in the location appliance 185, working alone or in cooperation with the server 121, may process the received reports to arrive at an estimate of the location based on, for example, the relative strength of the signals, etc.

In particular, the location appliance 185 may determine the coordinates of a particular portable device 180 or an electronic tag 182 based on the readings of the device or tag or, in case passive RFID tags are used, based on the readings of one or more choke points. The location appliance 185 may generate a set of coordinates for the particular device or tag and report the coordinates to server 121. In accordance with this exemplary embodiment, the location appliance 185 may be a generic device and may require little or no configuration in order to properly work within the process control system 100. The server 121, on the other hand, may contain system-specific information such as the definition of security levels, for example. One could additionally configure the server 121 to request operator-specific information and control area definitions from the registry 125 and the database 123. In operation, the server 121 may process the coordinates reported by the location appliance 185, translate the coordinates into one or several areas of control and, based on the operator-specific information, deny or grant (full or partial) access to these control areas to the operator.

As indicated above, other configurations of the location appliance 185 and of the server 123 are also contemplated. As an alternative to the approach discussed above, the location appliance may identify one or more areas of control in addition to calculating the coordinates of a device or tag. The subsequent determination of the level of access of a particular operator may take place in the server 121 or the portable 180. One skilled in the art will further appreciate that the steps of estimating the location, mapping the location estimate to a list of control areas, and granting or denying access based on the operator's privileges and his or her location may be also distributed among the static or mobile components of the process control system 100 in a number of ways.

While using the available installations of a wireless network to ascertain the position of a portable device may provide a cost-effective solution, other embodiments are also contemplated. For example, the portable device 180 may be equipped with a Global Positioning Service (GPS) unit which may communicate with a satellite constellation (not shown) in order to obtain a set of coordinates corresponding to its physical location. As discussed above with respect to the WAP approach, the data may then be processed either by the server 121 or by the portable device 180 or both to determine the control area in which the portable device 180 is currently located based on its GPS position or coordinates.

As yet another alternative, the portable devices 180 may rely on an external device for GPS data. As is known in the art, cellular phones are often equipped with GPS receivers and, mostly due to the flexibility afforded by such portable development languages like Java, may be easily furnished with custom applications. Thus, it is possible to use a cellular phone both as a data modem and as a GPS unit. This embodiment may be a reasonable option in situations where the existing infrastructure may not be easily changed or expanded to include wireless access points. In these cases, the process control system 100 need not have access to a wireless network at all, the only stipulation being that the facility equipped with a process control system resides in the area where cellular coverage is available. In this case, a regular portable computer or other handheld device may simply be carried around the facility with a cell phone connected to it via a USB, Bluetooth, or any other port and the location of the portable computer may be determined based on GPS signals from the cellular phone.

Figure 2:
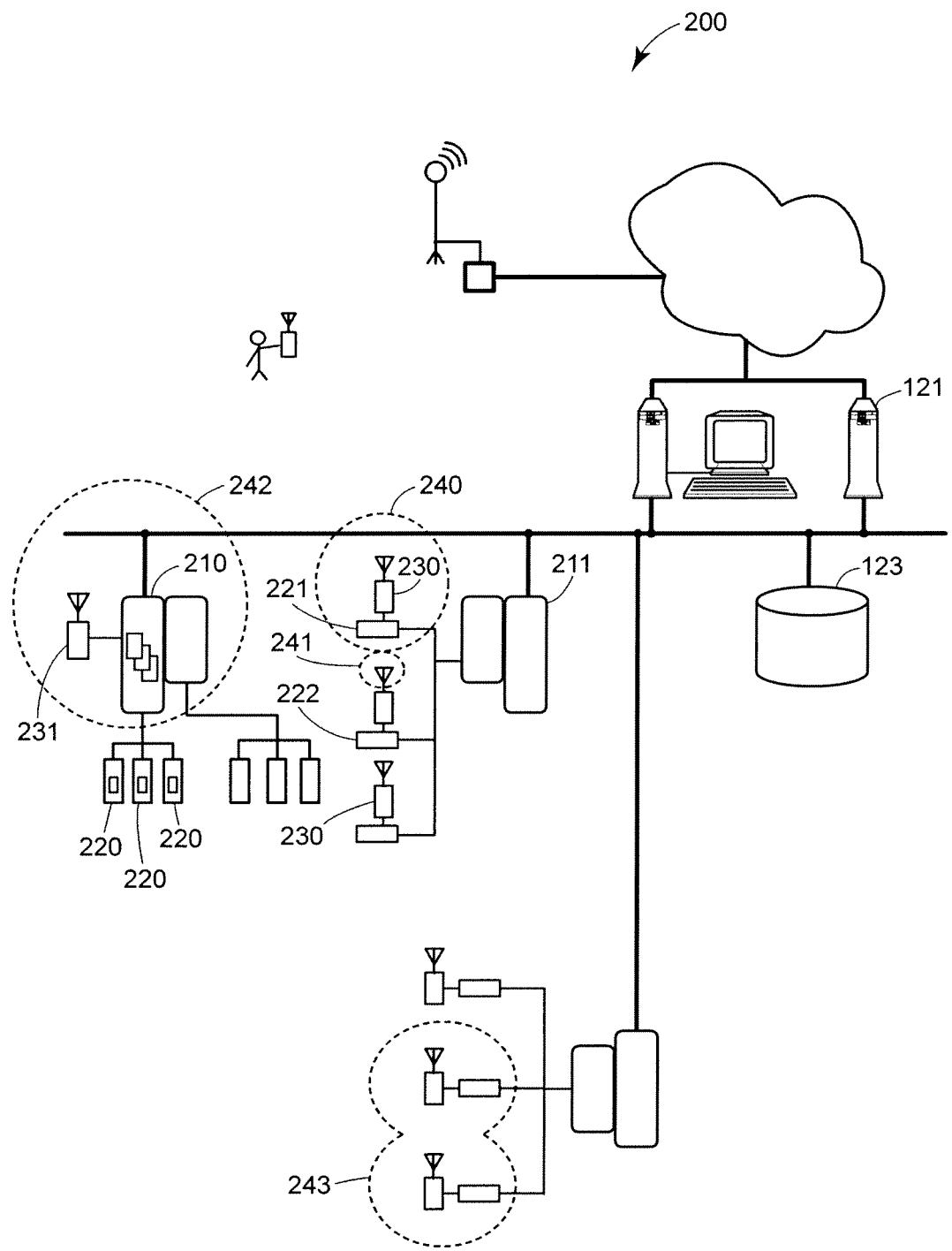
FIG. 2 is a block diagram of a process control system divided into several geographic areas and including transceivers associated with individual devices or with groups of devices.

FIG. 2 illustrates another method of obtaining relatively precise information regarding the location of the portable device 180 in which the portable devices 180 communicate with transceivers or other equipment disposed on or in close proximity to the process equipment itself. Similar to the process control system 100, a process control system 200 of FIG. 2 may be divided any number of control areas indicated as control areas 240-243. The process control system 200 further includes several controllers 210 and 211, I/O devices, and field devices 220 and 221. A portable device 180 may similarly rely on wireless access points that belong to either a local or a non-local network, to communicate with the control system 200. The portable device 180 may, however, rely on other signal sources located within the plant to ascertain location in a relatively precise manner. For example, field devices 221 may be operatively coupled to one of the many types of wireless transmitters known in the art. Thus, one or more of the field devices 221 may be connected to a device 230 which may be Bluetooth device, an infrared device, a barcode scanner, a radio transmitter, or to any other source of a signal detectable at a reasonably small distance. Some devices may not be coupled to signal transmitters directly. For instance, field devices 220 may all be coupled, via an I/O device, to the controller 210 which, in turn, is coupled to a transceiver 231. In this embodiment, the portable device 180 is equipped with a wireless device of a similar or compatible type in order to be able to communicate with the devices or groups of devices coupled to transceivers 231. For example, the portable device 180 should support Bluetooth technology if transceivers associated with parts of the process control system are Bluetooth devices.

It has already been indicated in the discussion above that the position of a portable device 180 need not be related to the relative strength or intensity of a received signal. In many cases, it may be enough to detect only the presence or the absence of a device within a certain geographic area. Thus, it may be sufficient to detect, by means of a Bluetooth device, for example, whether a certain portable device 180 has entered an area in which a connection may be established. Thus, in this case, actually establishing the communication connection or measuring the potential quality of such a communication connection may not be required at all. Instead, the portable device 180 may simply register the event of having entered the area in which a Bluetooth device, uniquely identified within the system, is capable of establishing a wireless connection and may determine the location of the portable device 180 based on that event.

It should be noted that methods of identifying wireless sources of signals are well known in the art. For example, Bluetooth devices may transmit an identifying block of information carrying the name assigned by the operator of the device, such as BLUETOOTH_DEVICE_001. Another technique well known in the art is "RF tagging," which refers to the method of supplying objects with a module periodically transmitting identification information at a known frequency. A skilled artisan will further recognize that relatively unique identification may be implemented with any wireless technology by one of the many known methods including barcode scanning.

Of course, in cases of asymmetric communication schemes, such as barcode scanning, the portable device 180 must be equipped with a barcode if plant installations rely on barcode scanners. Alternatively, the portable device 180 may be equipped with a barcode scanner instead and plant installations, such as field devices 220 or controllers 210 and 211, may carry barcode labels. Generally speaking, it should recognized that signal sources may be associated with either portable or stationary devices while signal detectors may be associated with either portable or stationary devices. Of course, the location detection system described herein may also use a combination of both of these techniques.

The relatively precise location of the portable device 180, obtained by any of the methods discussed above, may then be compared to the data defining the set of control areas by, for example, the access control software. This step may be performed either by a software running on the portable device 180 or by the server 121 or through a cooperative effort of both. As discussed above, control areas may be defined in many possible manner and combination of various definitions may be used in the same system. Referring back to FIG. 1, the control area 102 is a polygon with a relatively precise vertex definition. In order to ascertain whether a certain portable device is located within the control area 102, either absolute or relative coordinates of the portable devices 180 must be obtained and compared to the set of vertices. Meanwhile, another operator 170 may be holding a portable device 180 located in the control area 103, which is defined as a rectangle. Though not isomorphic in shape, control areas 102 and 103 conform to the same format of definition and thus the same algorithm may be used to determine whether portable devices with certain current coordinates are inside of or are outside of the control areas 102 or 103.

On the other hand, the process control system 200 shown in FIG. 2 may define control areas as areas where a portable device detects the given signal such as a search signal at or above a certain level. As discussed above, the detection scheme between mobile and stationary devices may also be inverted, in which case the portable device 180 would serve as the source of a wireless signal and control areas would be determined as regions within which the portable device 180 is sufficiently close to a process device or a transceiver for the receiver on the process device to detect the transmitted signal. In FIG. 2, the control area 240 is associated with the device 221 and is shown as an oval or circular area. In the environment where the passage of a signal, such as radio waves, is relatively unobstructed, a user carrying a portable device 180 will enter the area 140 when he or she comes to within a certain distance from the source of the signal. Another control area 241 is a defined as a circle with a smaller radius which may be due to a weaker signal or to certain obstacles in the path of the signal. Importantly, control areas 240 and 241 may overlap in some places. Depending on the configuration chosen by the administrator of the process control system 200, a user may be considered to be within both of the control areas 240 and 241, within neither control area 240 or 242, or within the control area chosen according to some priority scheme defined for the system (e.g., if in range of both control areas, the user may be assigned to control area 240 having a higher priority then control area 241).

FIG. 2 further illustrates a control area 242 that is associated with a controller 210 coupled to several field devices 220, in which case the location determination system may be configured to include all of these field devices, regardless of their actual physical location, into the area 242. In yet another example of control area definition, a control area 243 is shown to include the region covered by two circles corresponding to two signal sources. As discussed above, each of these signal sources may be associated with any level of a subsystem, such as a field device, a control loop, a controller coupled to a plurality of field devices, etc. Furthermore, it should be noted that the methods outlined above to be used by the system 200 may also be used in addition to the methods used by the system 100.

The access control system may be distributed over a plurality of stationary hosts, computers, or controllers connected via the communication network 150, such as the access server 121 and the controllers 110, and the portable communicators 180. It will be appreciated that some of the functionality of the access control system, such as measurements and calculations performed by software routines, may be distributed according to a variety of approaches. For example, a software routine that determines whether a certain element of the process control system 100 may be accessed by the user 170 using a portable device 180 at a given location may run on the access server 121 or on the portable device 180. Alternatively, the function of this routine may be carried out cooperatively by the access server 121, the location appliance 185, and the portable device 180. Further, the access control system may rely on data received from devices, such as Global Positioning Service satellites, disposed outside the process plant 101. It will be appreciated that the access control system may involve both stationary components of the process control system 100 or 200, mobile components such as portable communicators 180, software routines distributed across these stationary and mobile components, and possibly elements of an external infrastructure such as the Internet to which the network 163 is operatively connected. In one embodiment, the access control system may include a portable communicator 180 equipped with a transceiver and that stores a software routine for communicating with the location appliance 185, a wireless communication point connected to some device within the process control system 100 so that the portable communicator 180 may communicate with the process control system 100, a list of control areas stored in the portable device 180, and another routine stored in the portable device 180 or in a host (such as the access server 121) that determines the level of access available to the portable device 180 at the current location.

Figure 3:
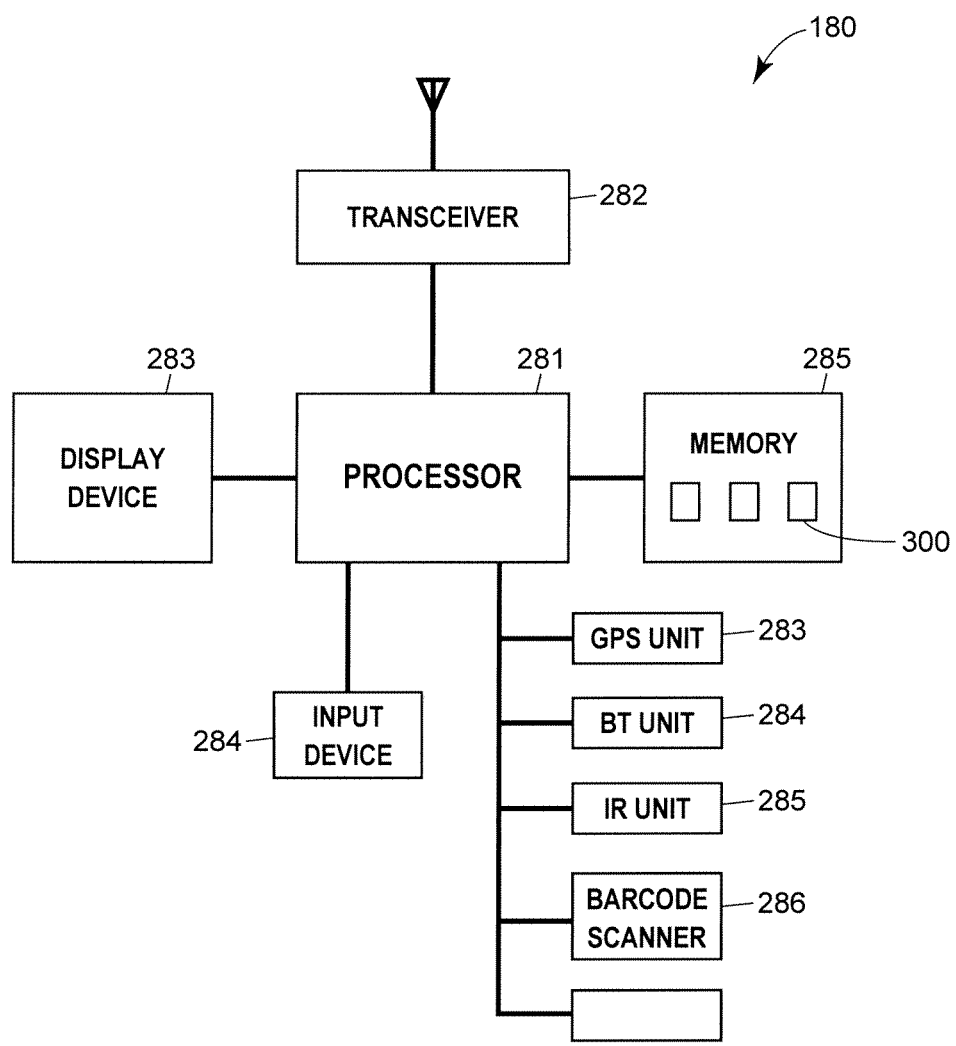
FIG. 3 is a block diagram of a portable communication device including a transceiver and expansion slots for additional communication modules.

Referring now to FIG. 3, a portable device 180 may include a processor 281, a transceiver 282, a display device 283, an input device 284 and a number of peripheral devices (not shown) coupled thereto. Preferably, but not necessarily, the processor 281 is a Pentium or higher class CPU mounted on a mother board with video, sound, RAM (e.g., 64 MB) and ROM communicatively coupled to a hard drive (e.g., 4.3 GB) shown as the memory unit 285, all of which may be located within a wearable and/or hand-held housing (not shown). Alternatively or additionally, some or all of the peripheral devices may be integrated within a housing of the device 180. The portable device 180 may include any number of communication slots or ports, such as PCMCIA slots, one or more of which can be used to receive the remote transceiver 282, a GPS unit 283, a Bluetooth unit 284, an infrared communicator unit 285, a barcode scanner 286, or any module capable of sending or receiving signals wirelessly. For example, an expansion slot may temporarily or permanently hold an electronic tag 182. The peripherals communicatively coupled to the computer 180 may also include a user input device 284 that may be, for example, a typical keyboard, a mouse, a track ball, or a twiddler device having a limited number of easy to use keys (such as function keys), the function of which may be defined differently for different applications. The memory 285 may be any type of memory including, for example, a disk drive (such as a hard, magnetic or optical disk storage device), RAM, ROM, EEPROM, EPROM, etc. The processor 281 executes one or more software applications 300 (stored in memory 285) using any of the inputs to the portable device 180 and information stored the memory 285 and/or information receive via the transceiver 282 or via any of the devices 283-286.

As discussed above, the portable device 180, alone or in cooperation with network elements, uses one of the methods discussed above, or a combination thereof, to collect information indicative of the position of the portable device 180 relative to the devices and groups of devices within the process control system 100 or 200. The process control system 100 or 200, alone or in cooperation with the portable device 180, determines which control area into which the corresponding measurement or set of measurements maps. Furthermore, the portable device 180 may also be required to execute additional authentication routines associated with lower layers of protocol stacks typically used in wireless communications.

In some embodiments, the portable devices 180 and/or the process control systems 100 and 200 do not initiate procedures directed to obtaining the location of the portable device 180 unless a specific condition is detected. In particular, the portable device 180 may not need to report the signal readings or measurements to the location appliance 185 to the process control system 100 or 200 at all times or at predetermined intervals. Instead, the location identification procedures may be triggered when an operator tries to access a particular domain of the process control system 100 or 200 or when the process control system 100 or 200 detects an abnormal or an emergency condition and attempts to locate the nearest operator.

Further, the process control system 100 or 200 may preferably update a registry 125 storing the latest known location of each operator or user in the process control system 100 or 200. The registry 125 is illustrated in FIG. 1 as being stored in the database 123, but could be stored in one of the host devices 121 or 120 or in any other desired database device. The registry 125 may contain such information as the name of each operator and his/her association with a particular subsystem or set of subsystems as well as a current location for the operator. For example, one operator of a manufacturing facility may be primarily responsible for electromechanical components while another operator may be primarily responsible with components related to chemical processes. The control access system may accordingly store this information in the registry in order to map each operator to his or her domains of control. The registry 125 may also contain the timestamp for the latest or several latest position update(s) of the operator. This information can be used for many different purposes, such as statistical analysis, personnel supervision and tracking, identifying possible emergency support, etc.

Still further, the registry 125 may communicate with one or more databases, such as the database 123, to obtain user identification and authentication information. Preferably, relatively permanent data, such as operator's role, level of access, authentication information, etc., is stored in a database, such as the database 123, while the registry 125 maintains the more ephemeral data such as operator's last known location, time of location update, etc. Moreover, the registry 125 may also communicate with the data historian residing in the database 123 or elsewhere in the system to obtain or store events, alarms, comments and courses of action taken by operators.

Prior to granting an operator access to the devices 130-131 or to other components of the process control system 100, the access control system preferably authenticates the operator by requesting, for example, login and password information via a prompt window presented on the portable device 180. The operator may log into the system for the duration of his or her shift and the access control system may consider the operator logged in regardless of the operator's physical position. In some embodiment, however, it may be desirable to increase the security of the system by implementing an inactivity timer. Upon expiration of the inactivity timer, the user may be automatically logged off and may have to log in again when trying to access one of the elements of the process control system 100. It is contemplated that any known authentication technique may be used to verify the identity of the operator and to preferably retrieve the operator's personal information from the database 123 or registry 125. In general, the access control system may grant access to devices or groups of devices to an operator in view of both the operator's physical location and of the authorization level of the operator. Because operators may have different access privileges to different devices, the access control system preferably defines several access levels and associates each device, device type, or control area with one of the defined access levels. The database 123 may store an access level indicator for each operator associated with the process control system 100 in order for the access control system to efficiently determine whether a particular operator is authorized to interact with a particular device.

It is further contemplated that for each device, the access control system may define a set of permissions, such as READ and READ/WRITE, for example. A certain operator may then have only READ permissions for a certain device and may, as a result, view the configuration or operation details of the device without being able to modify any aspect of the operation of the device. Meanwhile, another operator may have READ/WRITE permissions and may both view the device configuration and change the configuration if necessary.

One of ordinary skill in the art will also appreciate that several other approaches to authorization level assignment known in the art are equally compatible with the process control system 100. As another example, the access control system may allow anonymous access to devices by defining only generic logins for such operator types as "administrator" or "technician." On the other hand, the access control system may, in another embodiment, store highly personalized authorization information for each device. For example, the access control system may associate a list of first and last names of users authorized to access a certain highly sensitive or valuable device.

Once the location of a portable device 180 and/or of the operator using the portable device 180 has been established, and has been mapped to one or more of the predefined areas of control within the process plant, the access control system determines the level of access that can be granted to this operator. Referring again to FIG. 1, the access control system may determine that an operator 171 is in the control area 104 and is therefore in relative proximity to the controller 110 and to the devices coupled to the controller 110. The access control system may then limit the properly verified operator's access to the system to area 104 only. However, the access control system may first consult the registry 125 or the other database, such as the database 123, to determine whether the particular operator is in fact qualified and authorized to configure or view the information for the particular subsystem or the area of control within which the subsystem is located. As discussed above, the access control system may check such information as the operator's area of expertise, level of access or seniority, shift assignment, or any other relevant data to perform this function. As a further illustration of applying registry and/or database data, control areas associated with different technical domains may overlap so that at a certain location, an operator may be within a control area of a set of chemical devices and within another control area of an electromechanical component. Clearly, it may be useful to both the operator and the process control system in general to filter out data that is not relevant to the particular operator.

Figure 4:
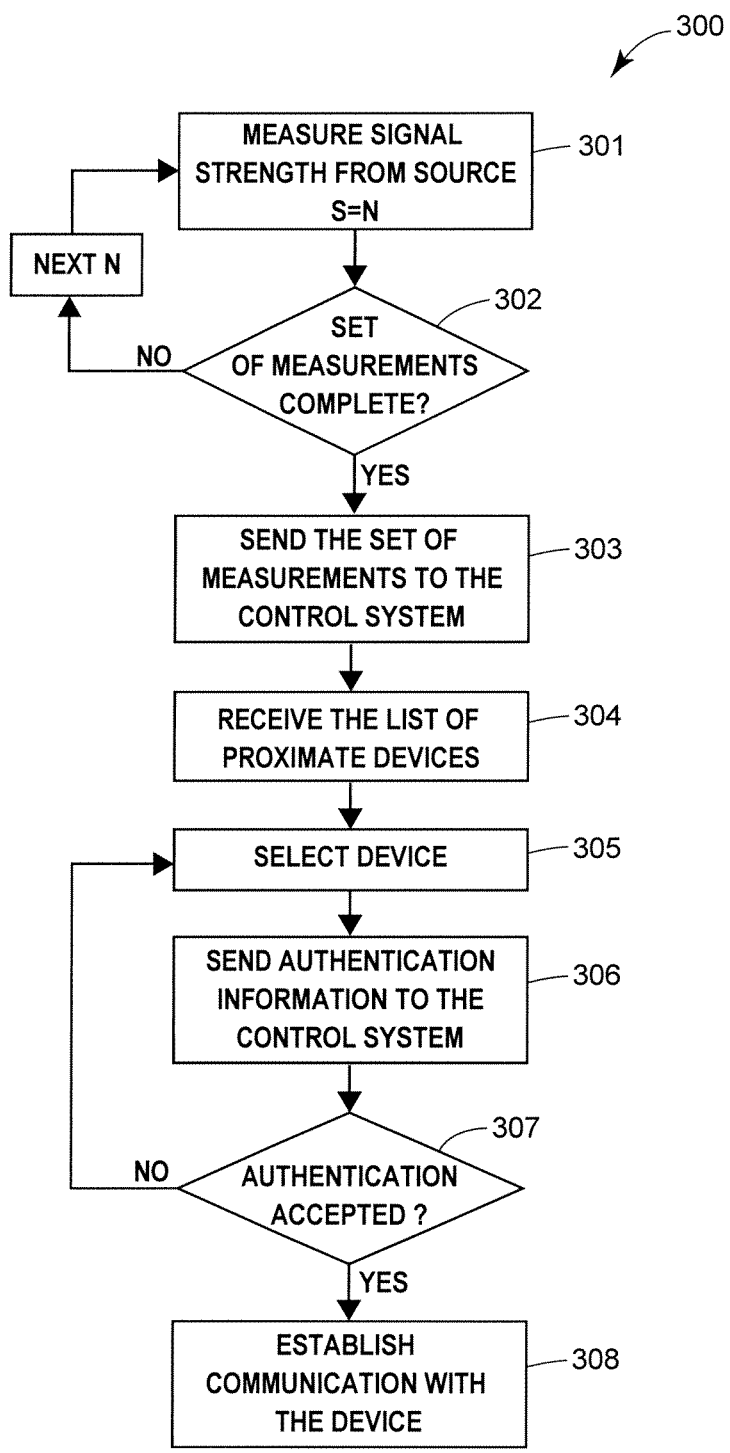
FIG. 4 is a flow chart illustrating a procedure executed by a portable communication for obtaining a relatively precise geographic location of the communication device or a tag and granting access to parts of the process control system depending on the obtained geographic location.

FIG. 4 illustrates a block diagram of a software routine 300 that may be executed on the portable device 180 to implement location determination and device or module selection based on the determined location. As discussed above, the portable device 180 may include a passive or active electronic tag 182 in one of expansion slots. In another embodiment, the portable device 180 may communicate via Bluetooth, infrared, or a similar wireless (or wired) link with a standalone device adapted to execute Local Positioning Service functionality. In some embodiments, the procedure 300 may be run on such standalone device. However, in some situations it may be desirable to install and run a software including the procedure 300 on the portable device 180, especially if the portable device 180 has higher processing power. The portable device 180 may be within the range of several signal sources, such as radio wave transmitters, at any particular time. However, the procedure 300 is preferably triggered upon the occurrence of one of a set of predetermined conditions, such as a user operation. Triggering conditions will be discussed below in greater detail. In a block 301, the procedure 300 measures the strength of the signal from one of the sources. As mentioned above, each signal source may be unambiguously identified through one of many methods known in the art, such as broadcasting a relatively unique sequence of numbers over a dedicated channel or providing other data indicative of a particular signal source within a search message. At a block 302, the procedure 300 may check whether there are other signals that may be measured. For example, if the portable device 180 detects four signal sources, the procedure 300 may iterate through blocks 301 and 302 until either the list is exhausted or until some predetermined limit is reached. In other embodiments, the portable device 180 may collect the signal measurements using WiFi or WiMax RTLS techniques or UWB RTLS techniques. Thus, it will be appreciated that the steps 301 and 302 are provided herein by way of example only.

Next, a block 303 sends the collected measurements to some host disposed in the process control system 100 or 200, such as the server 121, via the wireless connection and the network 163. Of course, the identity of the portable device 180 is also provided at some time, either in the block 303 along with the measurements or, in a more typical scenario, earlier when the device 180 registers with the wireless network 163. The server 121 may, in turn, propagate the information further or may execute a procedure that determines the location of the portable device 180. In this exemplary embodiment, the procedure 300 then waits for the network 163 to respond with the information related to the operations allowed at the location determined in the steps outlined above or with respect to the receipt of or access to data requested by the portable device 180. As will be shown below in greater detail, a host, such as the access server 121 on the network 150 may execute a procedure or a set of procedures to identify the control area, if any, in which a portable device 180 is currently located and provide to the portable device 180 the information related to the scope of operations allowed for the particular user in this area and/or may control the scope of operations (including access to data such as configuration data) allowed for the particular user based on the control area in which the user is currently located.

Referring again to FIG. 4, the procedure 300 may receive, in a block 304, the information from the network 150 in response to the collected measurement reports sent earlier in the block 303. In one embodiment, the information may include the list of proximate modules, field devices or control loops that are assigned to the identified control area, although this data may not be necessary. The information may also include a list of outstanding alarms and alerts that the operator may acknowledge or otherwise process. Of course, the ability to view and acknowledge alarms and alerts and/or to have access to data and configure parts (e.g., devices, modules, etc.) of the process control system 100 or 200 is also limited by the operator's authorization level. The access controller within the network host 121 or other device and communicating with the portable device 180 may determine, by consulting the database 123 or by communicating with another application on the same server 121, for example, the restrictions for the particular operator prior to sending data to the portable device 180. In one embodiment, a complete list of devices within the control area is sent to the device 180 regardless of the level of restriction but additional information, indicative of restriction conditions for each module, is sent to the portable device 180 at the same time. In this manner, a corresponding application running on the portable device 180 may present all of the available information to the operator while indicating that some devices and/or alarms may not be configured or acknowledged. Presentation of data to the operator will be discussed in greater detail below.

Next, the operator may use the routine or procedure 300 to select one of the modules, devices or pieces of equipment for viewing or configuration. In a block 305, the procedure 300 receives selection data from the user and verifies authentication information, such as login and password, in accordance with the restriction information received from the network 150. In general, access to devices within the process plant 101 may be controlled in a manner similar to that available at stationary workstations. However, as indicated above, the operator may not be able to view or configure devices that are not in his or her close proximity, i.e., that are not in or associated with the control area in which the operator is currently located. Alternatively, an operator may have a restricted view of the devices to which he or she is not able to access or control due to control area in which the operator is currently located. If desired, the interface of the portable device 180, which typically includes a graphical user interface (GUI), may present inaccessible devices in a "grey-out" format, in a different font or color, with a particular graphical icon next to it, or in any other manner, to visually and/or textually indicate the restrictions to the user. Returning to FIG. 4, a block 306 sends the authentication information entered by the user to the network 150 if the user has not previously registered with the access control system. In most cases, the access control system will simply verify the authentication of the user by checking the run-time registry 125 or the database 123 and, if the required authentication has not expired, the procedure 300 will simply skip steps 306 and 307. Otherwise, the procedure 300 waits in a block 307 for acceptance or rejection by the network 150. More specifically, one or more software routines may run on the access server 121 and/or the workstations 120, either in a standalone or in a distributed manner, to process information from controllers 110 or 210, various field devices, such as devices 130, portable devices 180, the database 123, and other components disposed on the network 150. If rejected, the procedure 300 may go back to the presentation of the available modules. If, however, the authentication is accepted, the procedure 300 may transition to the set of screens/menus/options related to viewing or configuring the selected module, device, etc.

While the procedure 300 is shown to expect a separate authentication for each device, the network 150 may simply request authentication once for all devices. In one embodiment, the blocks 306 and 307 are integrated within the initial wireless authentication procedure (not shown) which is executed when an operator logs onto a workstation, such as the portable device 180, from any location in the plant 101 associated with any area of access.

In a block 308, the operator's location within the plant, factory, or any facility implementing a process control system, is established and he/she is properly authenticated for a particular control area associated with the area enclosing the operator's current location. The operator may proceed to work with the modules, field devices, controllers, control loops, units, etc. within that control area or which are associated with that control area either by transmitting commands via the wireless connection provided by one of the proximate wireless access points 160-162 (which may include access points on the field equipment itself) or, in another embodiment, by sending commands directly to a device via a local communication port, such as a wireless communication port. In the latter case, the network 150 may communicate with the portable device 180 by means of the Ethernet connection 150 after ascertaining the location of the operator and verifying his/her authentication information. It may be possible in some cases to communicate with the portable device 180 directly, in which cases the network 150 must prevent field devices or controllers or other plant equipment from communicating with the portable device 180 until the location of the portable device 180 is processed and approved for use with the given piece of process plant equipment.

At least some of the information, such as the layout of the facility wherein a process control system is implemented, the location of modules, lists of control areas, and lists of modules for every area, for example, may also be stored in the memory of the portable device 180 itself. This data may replace, supplement, or duplicate the data stored on the network 150. In one embodiment, such data is stored in a format recognizable by both the portable and the stationary elements of the process control system 100 or 200 so that a portable device 180 can still view the information when offline or when the access to a particular subsystem is denied due to the current location of the portable device 180, lack of authority of a particular operator to use the information, or any other reason.

In the embodiments that do not rely on either relative or absolute coordinates, such as those illustrated in FIG. 2, the location of the portable device 180 need not be determined as a set of global or local coordinates on a plane or in a three-dimensional space. It is contemplated in general, geographic areas may be approximately determined by simply picking the strongest signal in a predefined frequency range. Of course, this method may yield only imprecise identification of location. However, it may be possible to define areas of control by simply associating each area with a signal emitted at a certain frequency and carrying a substantially unique identification. This embodiment may be preferable when the cost of using GPS or using one of the Local Positioning Techniques is prohibitively high.

Figure 5:
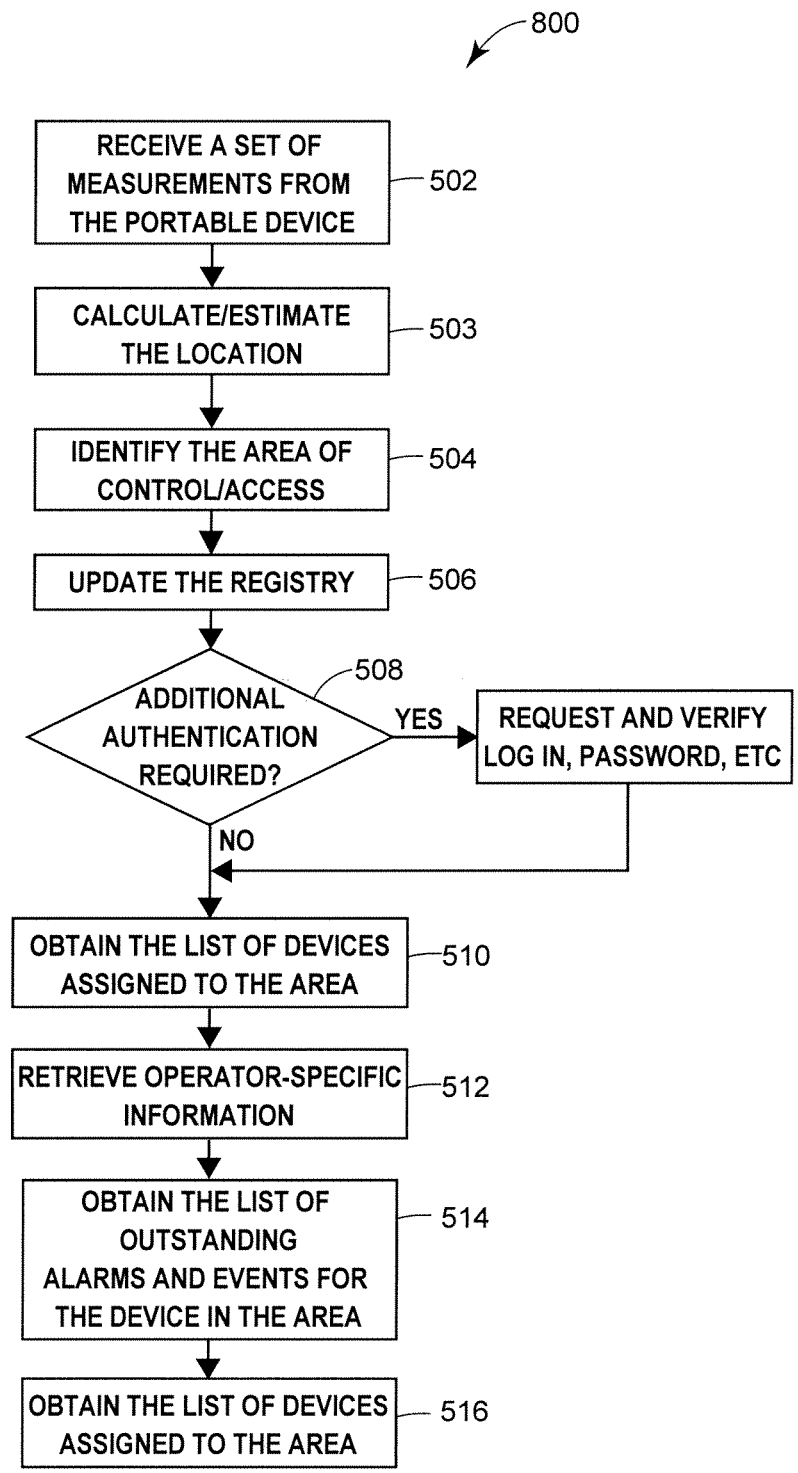
FIG. 5 is a flow chart illustrating a procedure executed by a host on a network associated with a process control system which processes a set of measurements received from access points communicating with a portable communication device or RFID tag and which sends area-specific information to the portable communication device.

While the portable device 180 may execute routines that correspond to embodiments illustrated in FIG. 4, a host on the network 150 implemented in the process control system 100 or 200 may execute the routine 500 illustrated in FIG. 5. At a block 502, the host 121 may receive a set of measurements in some predetermined format. At a block 503, the host 121 may determine, based on the received set of measurements, the location of the portable device 180. The host 121 then consults the database 123 in order to map the current location of the portable device 180 to one or more predefined control areas, the specifics of which are stored in the database 123. Of course, the current location of the portable device 180 may also fall outside of all of the predefined control areas.

A block 506 updates the registry that maintains the up-to-date information regarding the location of operators (or more specifically, the location of the portable devices 180). Specifically, the routine 500 may record either the control area or even the physical location within the control area, the operator's identity, and the time when the identification of the location and the control area took place. While this step may be omitted in many cases, it should be understood that recording the last known location of a portable device can be used for many purposes. For instance, it is contemplated that an operator at another workstation, such as at the workstation 120, may monitor the location of operators carrying portable devices. Further, the registry may be periodically "dumped" into a permanent database or may be synchronized with a data historian. In this manner, the location of operators may be later used in investigations of problems or in modeling emergency conditions. Still further, the registry may be also be used by an application that tracks operators' work hours or other activities. In that sense, the system generally described in FIGS. 1-6 may fulfill an additional function of recording "punch in" and "punch out" times in those common situations where operators are expected to be within a certain area during their assigned shifts.

Further with respect to FIG. 5, a block 508 may check whether additional authorization is required from the user of the portable device 180 and the routine 500 may, in a block 509, conditionally request additional authorization and verify the operator's permissions for the particular area. However, the routine 500 may proceed directly to a block 510 which requests the list of field devices, control loops, or other modules or data assigned to the particular control area. At this time, the routine 500 may also retrieve any additional relevant information for each module, field device, control loop, process equipment, etc. The routine 500 then processes restriction information for the operator as it applies to each module, field device, control loop, process equipment, etc. For example, the routine 500 may check the operator's recorded area of expertise, his/her shift assignment, seniority level, etc. After checking authorization in the block 512, a block 514 of the routine 500 consults another or the same registry or any other database for any outstanding alarms or events to be sent to the operator. For instance, the process control system might have detected a low-severity alarm earlier and may decide to push it to the operator at this time because the operator is now apparently located in close proximity to the module.

Finally, at a block 516, the routine 500 sends the information to the portable device 180 or may allow the portable device 180 to access or change data, such as configuration data, pertaining to one or more elements of the process control system based on the operator's current location. As has been discussed above with reference to routines running on the portable devices 180, the information may be sent in many different formats. In particular, the access control system may send only the current restriction information to the portable device 180 if the device stores a synchronized version of the plant's layout, area assignments, etc. When it is desirable to minimize the amount of data transmitted between network elements, the network 150 may simply notify the portable device 180 regarding one or more control areas for which the network 150 will accept commands from or provide access to data or functionality by the portable device 180. The software running on the portable device 180 will update the user interface and the memory of the portable device 180 accordingly. Alternatively, the access control system may send more detailed information to the portable device 180. One of ordinary skill in the art will recognize that various other methods of implementation are possible.

Figure 6:
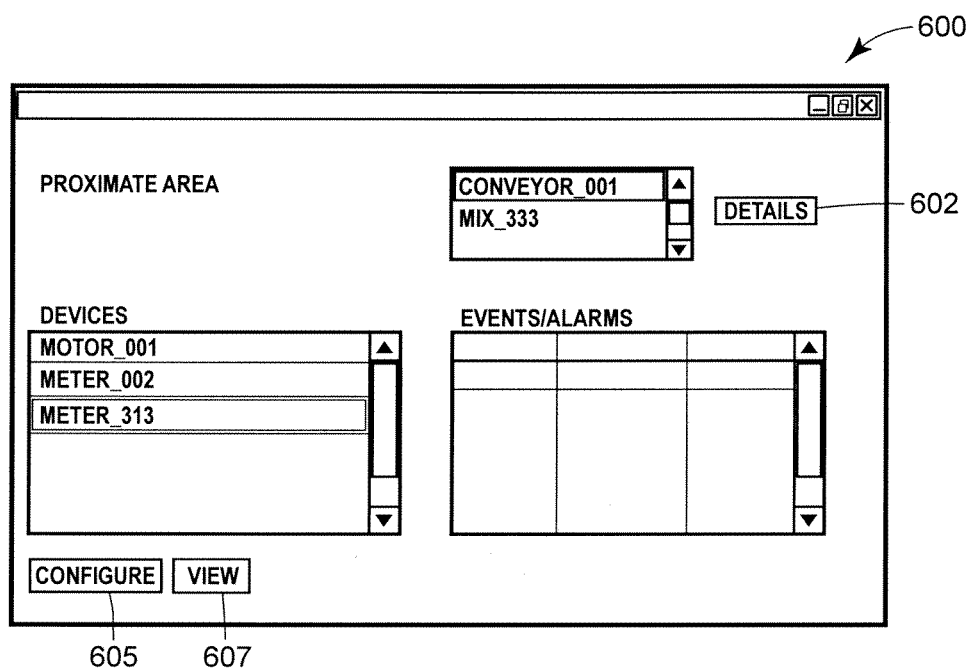
FIGS. 6-8 illustrate several example screen displays which may be shown on a portable device during operation within one of a set of areas of access for which an operator using the portable communication device is properly authorized.
Figure 7:
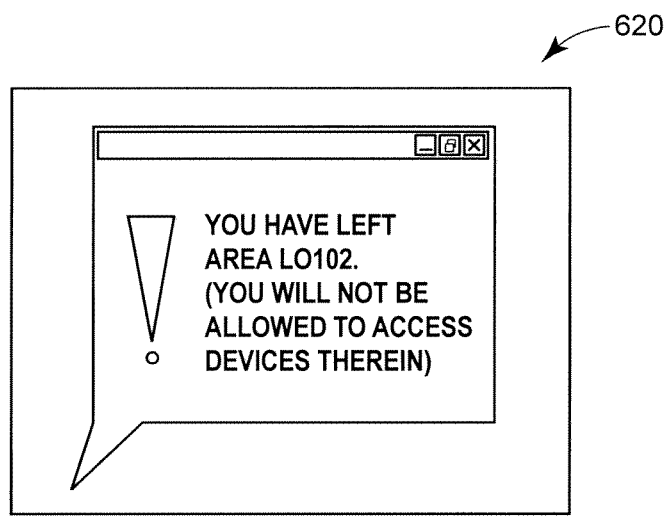
Figure 8:
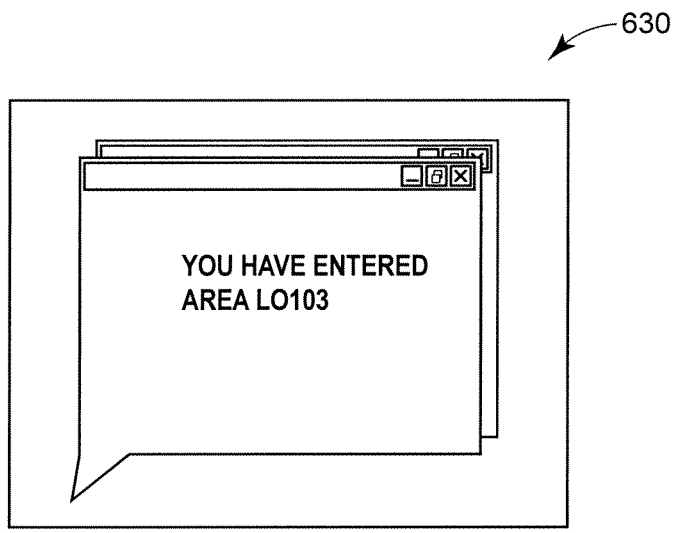

FIGS. 6-8 illustrate some of the sample screens that the portable device 180 may generate for the operator while the operator is working in a certain control area, as it is desirable that information be presented to and collected from the operator in some graphical, easy to use format. The screen 600 of FIG. 6 presents a pull-down list of those control areas for which the operator has been granted permissions based on his or her current location. The identification tag for the menu is here shown to be "PROXIMATE AREAS." In one embodiment, the areas that the operator has previously visited or may visit in the future are still visible in the pull-down list but are clearly marked in some manner as inaccessible. Preferably, some of the other pull-down menus on the screen 600 are not presented at all for those areas that are "grey" or otherwise marked inaccessible in the "PROXIMATE AREAS" menu. The operator may also press the radio button 602 marked "DETAILS" for each proximate area. In response to clicking on the "DETAILS" button 602, the portable device 180 may display the description of the control area in some textual or graphical format. The portable device 180 may also provide additional information such as the list of other operators authorized to work in the area, the history of previous access attempts, configuration changes, alarm acknowledgement, and/or any information helpful to the user. Of course, the portable device 180 may not store this data in its memory and may have to request this information from the network 150 implemented in the process control system.

Further, the screen 600 illustrates the list of modules or devices or other data or functionality (such as applications which can be run or implemented by or from the portable device 180) associated with the selected control area, assuming that selection is only allowed for those control areas in which the operator is currently located. The operator may scroll up and down the list and select individual or groups of modules, devices, applications, etc. Preferably, the operator may click on either the "CONFIGURE" button 605 or the "VIEW" button 607 to choose the appropriate operation. Of course, other actions may be similarly presented on the screen either graphically, textually, or in some short-key format. In this sample embodiment, the operator may click on the "VIEW" button 607 in order to check the status of the module, view its specific event history, etc.

Additionally, the pull-down list of events and alarms may be presented either next to the list of devices or may be drawn in response to user selecting a particular field device, control loop, or other module or device from the "DEVICES" list. In one embodiment, "EVENTS/ALARMS" is always visible on the screen 600 so that the operator may immediately see the alarms or events even before selecting a particular module or device. Moreover, the user interface may be designed in such a way that the severity of alarms and the relative importance of the events is associated with different colors, or using some other form of visual distinction, such as blinking of the important events or displaying an arrow next to these events. Further, the selection of the "CONFIGURE" button 605 may trigger a new screen or a new family of screens.

In some embodiments, it may also be desirable to provide real-time notifications to operators as they move through the facility where the location based access control system described herein is implemented. Particularly, in those cases where the portable device 180 performs periodic updates of its location, the portable device 180 might display pop-up boxes shown as screens 620 and 630 in FIGS. 7 and 8. In the screen 620, the user is notified that he or she has left the given area and will no longer have access to the associated devices or equipment. Meanwhile, the screen 630 notifies the operator that the portable device 180 is now in a new control area. These pop-up notifications may be optionally turned off on a particular portable device to account for those cases where operators frequently move between areas and do not wish to be inundated with non-essential information.

In accordance with other embodiments, the portable device 180 may provide notifications which are less intrusive than the pop-ups illustrated in FIGS. 7 and 8. For example, each of the access privileges defined by the access control system may be visually associated with a different color, such as green for full (read/write) access type, yellow for read-only access type, and red for no access. For example, a pull-down list of flow meter devices used in the process plant 101 may include a color indicator placed next to each flow meter, each color indicator displaying one of the three colors depending on the physical location of the user and on the level of authorization of the user. Alternatively, the textual identifier of each flowmeter may be coded with one of the three colors. In accordance with this embodiment, the user may see a symbol or text corresponding to a device change colors as the user moves toward or away from the device indicating, at one point, that access to a certain device is no longer allowed due to an unallowable distance from the device or, conversely, than the user is now within the location area with which the device is associated. One familiar with standard GUI solutions will also recognize that certain indicators may additionally flash or pulsate in order to attract operator's attention.

As indicated above, a color indicator may combine the permanent authentication restriction with the location-based access restriction. For example, a first operator may not be allowed to access a certain control loop irrespective of his or her distance from the control loop. Meanwhile, a second operator may have access to the control loop but the access control system may require that he or she stand within ten feet of the control loop when making any changes to the control loop. Thus, it is contemplated that some embodiments may include multiple indicators to separate the restriction information based on an operator's profile from the temporary restriction information based on the operator's current location.

In other embodiments, the access restrictions may be illustrated using grayed-out or crossed-out text, by disabling "submit" buttons in device configuration or editing windows, and other methods known in the art. Moreover, visual indicators displaying location-based restriction (alone or in combination with authentication-based restriction) are compatible with other forms of presenting the environment of the process plant 101. For example, the devices and control loops of the process plant may be illustrated schematically on the display of the portable device 180. The user may see the same static display representing the process plant 101 as he or she is moving through various control areas of the process plant 101. However, the devices or device-specific color indicators may change colors as the user enters or leaves the corresponding areas of control.

Further, the access control system may be configured or hard-coded to only provide warning indications to user accessing devices, control loops, or other elements outside their current areas of control instead of preventing them from viewing or modifying these elements. For example, the access control system may still allow a properly authorized operator to modify a certain element but may display a warning message on the bottom of the screen that the operator is not sufficiently near the device. In a more typical scenario, an operator may approach a certain device and request a read-out of a certain process parameter from the device via the portable communicator 180. In this embodiment, the access control system will allow the operator to obtain the requested reading but the software running on the portable device 180 will display the readings in a hashed box or in a color suggesting a warning (such as yellow), or will display the reading in a normal manner but will additionally display a pop-up message suggesting that the user requested the reading erroneously.

In general, the access control system may be configured to either prevent access to elements of the process plant 101 from outside the proper areas of control, to partially restrict access to these elements to operators currently located outside the proper areas of control (such as limiting read/write privileges to read-only), or to leave access privileges intact while displaying a warning indication and/or recording such instances of access in a log. Of course, the access control system may also use a combination of the methods listed above and enforce, for example, strict access rules on certain critical areas of control while relaxing the restriction on other areas of control.

Figure 9:
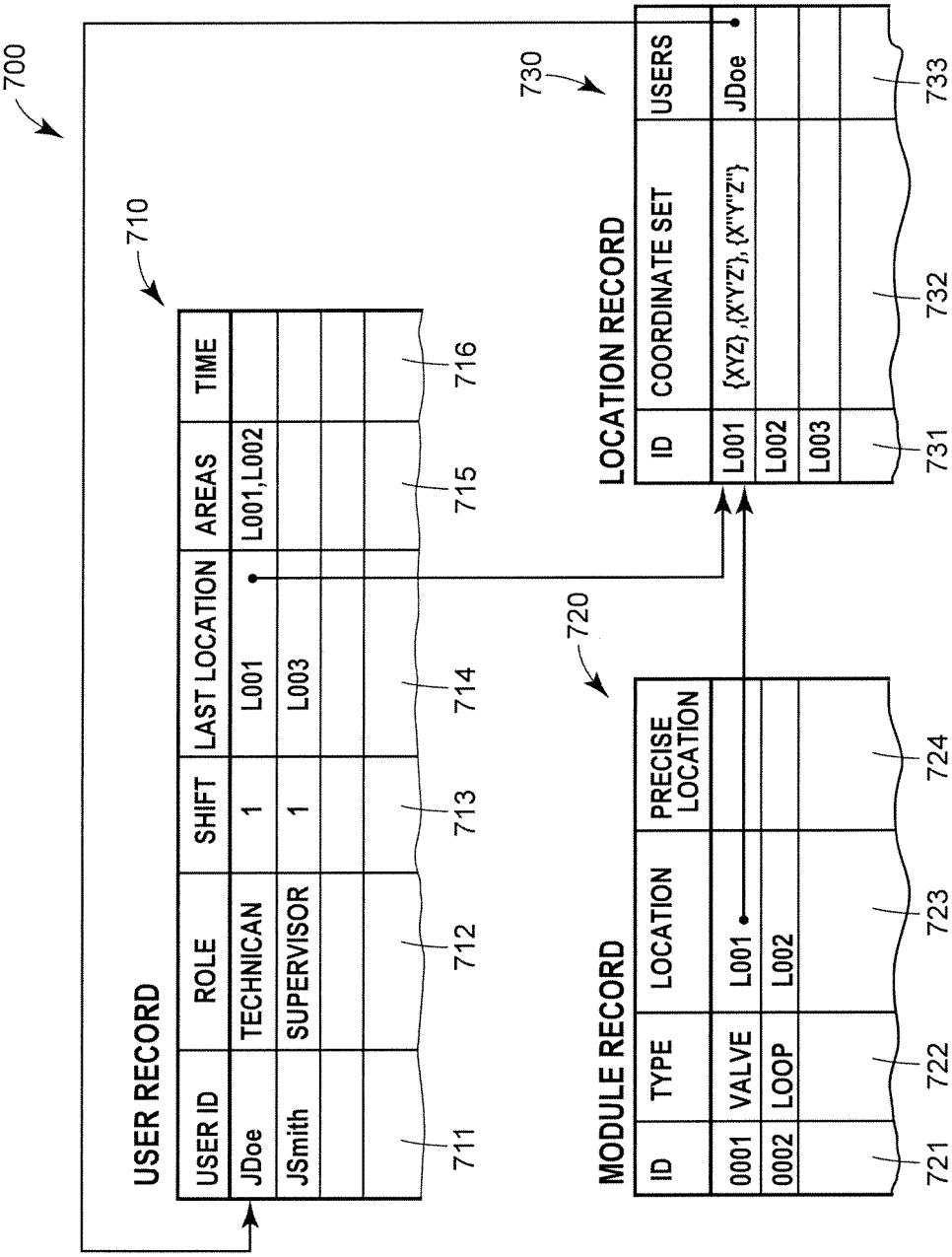
FIG. 9 is a schematic representation of an example data architecture used by a process control system to communicate with a portable device.

Preferably, the information related to users, events, and control areas is organized in the manner that allows efficient control and selection. For example, the registry 125, or a relational database such as that shown in FIG. 9 or a combination thereof may maintain several tables, such as "USER RECORD" illustrated with reference number 701, "MODULE RECORD" illustrated with reference number 702, and "LOCATION RECORD" illustrated with reference number 703. The tables 701-703 may be linked together by supplying the corresponding records with fields that identify records or groups of records in other tables. In the context of the location based access control system described herein, it is desirable to efficiently connect data related to field devices, control loops, and other elements of a process control system to data related to operators that service, use or configure the process control system. Moreover, by also connecting these categories of data to the information about area layout and device-to-area assignment, the access control system may further achieve a higher efficiently in allocating resources and providing a higher degree of reliability and operational safety. It will be further understood that the data architecture described below is one of the many possible approaches to organizing information related to the location based access control system described herein and is meant as an illustration only.

The "USER RECORD" table 710 preferably contains columns for such user specific information as a user identification or login 711, the user's role in the organization 712, the user's shift assignment 713, the last location of the user 714, the area of control 715, the time at which the user was at this location 716, etc. If desired, the same record may contain additional personal information, such as password or sets of passwords. User identification, such as login information, should be sufficiently unique as to unambiguously refer to a particular operator within the process control system 100 or 200. The role field 712 may enumerate the possible positions within the organization servicing the process control system 100 or 200. This role field 712 may be further subdivided into additional categories. For example, a "technician" may also have a particular area of concentration, such as "chemical components" or "electromechanical" components. Further, shift information may relate to the operator's availability but may also imply an additional level of access. For instance, the access control system may be configured to allow greater or lesser access to otherwise equally qualified operators at different work shifts. Of course, this information may also be stored as a listing of particular hours or in any other manner.

Importantly, as indicated above, the "USER RECORD" table 710 may contain the identifier of the latest location where the operator was "seen" or detected by the access control system. Specifically, when an operator enters a control area, the "LAST LOCATION" field 714 or the "AREAS" field 715 for the user's record may be updated with this information. The access control system may not need store the determined location of the operator, but may instead store the control area to which this location belongs. The access control system may, however, store either one or both of these pieces of information. Preferably, this update is time-stamped so that the system or an operator using the system may later be able to assess the relative quality of this information. As discussed above, the information in the table 710 may be periodically provided to a data historian, such as the data historian 135 of FIG. 1, for recording or supervisory functions.

Referring again to FIG. 11, a sample data structure for a process control system element is illustrated as "MODULE RECORD" 720. Each module, which in this case may include devices, equipment, process control modules, loops, etc. is preferably identified with a number or an alphanumeric string. The type of the module, such as "VALVE" or "AIR PRESSURE CONTROL LOOP" is also identified in the table, preferably as a number corresponding to some enumeration scheme. The location of the module, which is also stored in the "MODULE RECORD" 720 may be a relatively precise location, such as a GPS coordinate of the module's approximate center, or any data that may help identify the geographic position of one or more physical objects associated with the module. Alternatively, the relatively precise location of the module is not stored at all and only the control area to which the location belongs is recorded. In some embodiments, however, it may be desirable to store both the location of the module as well as the control area in which the module is located.

Each control area location is, in turn, described in a separate table. As with operators and process control system elements, each control area location is preferably assigned a unique identification number. The record for each process control area location may include either a set of coordinates defining the control area, a set of center and radius combinations defining the control area, or any other data that defines the area or volume of space associated with a control area. Thus, if desired, the location record 730 may store a different description of each control area than a coordinate set. For example, the description of a control area may be simply the identification information of the corresponding signal emitter, barcode information associated with the control area, a set of devices or transmitters within a particular control area, or any other identifier. In this case, identifying the control area in purely geographic terms may not be necessary, as long as each control area has some defining characteristic, such as the frequency of a radio signal transmitted from a central location within the control area. The "LOCATION RECORD" 730 may further store the list of users currently detected to be within the control area.

As shown in FIG. 11, unique identifiers assigned to users, modules, and areas help create logical connections between database tables 710, 720 and 730. For example, the "LAST LOCATION" field 714 in the "USER RECORD" 710 may store an identifier which serves as the index into the "LOCATION RECORD" table 730. Similarly, the "USERS" field 733 in the "LOCATION RECORD" table 730 may point to one or more records in the "USER RECORD" table 730. This sample data storage architecture allows the access control system to quickly perform such operations as, for example, retrieving the list of users located in a specified control area, retrieving the list of devices, modules, equipment, etc. associated with a specified control area, obtaining the last or most probable current location of a specified operator, etc.

The data organization structure outlined above may further permit targeted alarm and event notifications to operators. In particular, the problem of selecting the appropriate operators for event and alarm notification is solved by pushing the corresponding messages to the operators configured to receive the messages at the most suitable time, such as when those operators enter the area where operator action is required. On the other hand, these messages may be sent to the most suitably geographically located operator when these messages arise, such as to the operator who is currently located within the control area in which the message arises or about which the message pertains. Thus, using location based access control as described herein enables the process control system to send messages, such as alarms and alerts or other messages, to persons associated with the maintenance or supervision of a facility at the time when these persons are most likely to handle the messages, e.g., when these persons are in the control area of the process plant to which the message pertains.

Figure 10:
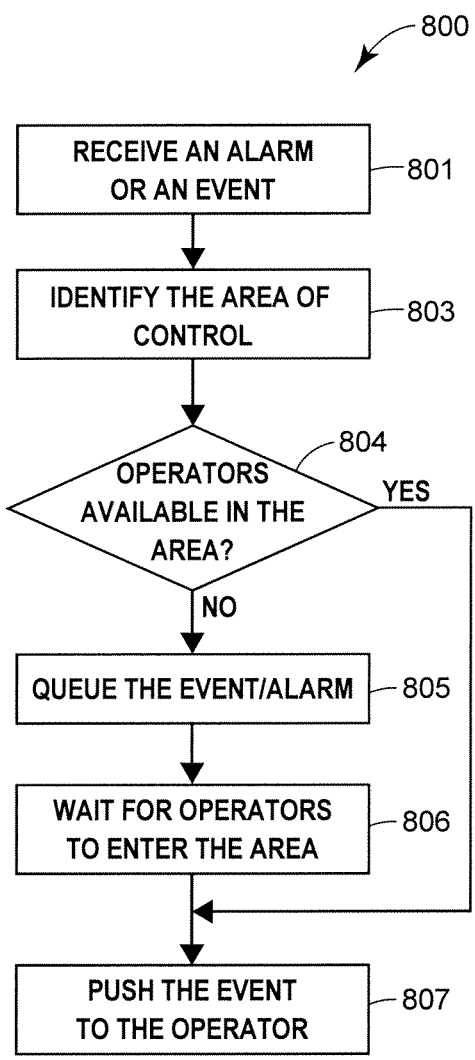
FIG. 10 is a flow chart illustrating a procedure that routes events associated with various elements of a process control system to operators based on their current location and the time that these operators enter areas associated with the elements that originate the events.

FIG. 10 illustrates a routine 800 that may be executed on a network host, such as the server 121 of FIG. 1, that monitors the operation of the process control system 100 or 200 and receives, records, and routes event and alarm notifications. In particular, the routine 800 determines the proper recipients of notifications in the process control system 100 or 200, such as the persons 170-172 generally diagramed in FIG. 1 or 2 to enable notifications to be sent to operators or other persons at the time when or the place at which these notifications are most likely to be properly handled. In particular, a block 801 of the routine 800 receives an event from one of the components of the process control system 100 (FIG. 1). As one skilled in the art will recognize, the events may be largely informational, such as a periodic measurement report from a temperature sensor, or warning events, such as borderline readings of a pressure sensor, or alarms, such as unexpected or abnormal conditions detected by a control loop maintaining fluid level at some predetermined set point. It will be further recognized that ranking of these events and alarms according to their importance and severity is implementation-specific and may be performed in a plurality of manners.

At the block 803, the routine 800 determines the control area to which the source of the event is assigned. As discussed above, the routine 800 may consult the database 123 to determine the control area. In particular, the routine 800 may find the component of the process system 100 or 200 in the "MODULE RECORD" table 720 based on the identification preferably received as part of the event information and, based on the LOCATION field 723, find the description of the corresponding control area in the "LOCATION RECORD" table 730. In another embodiment, the routine 800 may receive this information from the component itself as part of the message header or message body. For instance, the protocol supporting message propagation within the process control system may define header fields that uniquely identify the area or even the precise location of the sender. However, this embodiment requires a lot of overhead because a single controller coupled to the Ethernet connection 150 may support multiple field devices, each belonging to a separate area. In this case, each controller 110 would have to maintain the mapping of devices to areas and/or locations. As is generally the case, a centralized approach, such as storing all location and control area data in a single location is procedurally more simple.

A block 804 consults the registry 125 or uses any other method to determine whether any operators are currently located in the control area determined by block 803. Here, several approaches are contemplated. According to one implementation option, the routine 804 may perform location verification, or initiate a separate routine to perform location verification, at the network side. For example, in accordance with the embodiment outlined in FIG. 1, each portable device 180 typically maintains a two-way communication link with the network 150. The network 150 may then send a message or any type of signal to the portable device 180 requesting that the portable device 180 obtain its geographic location using software or hardware within the portable device 180. Alternatively, the network 150 may perform triangulation or any other technique to identify the location of the user based on data sent by the portable device 180 or one or more devices within the process control system, such as one or more of the WAPs 160-162, the transceivers 230 on the process equipment (FIG. 2), etc. As yet another option, the access control system may simply consider the information stored for each area of control to be sufficiently accurate. For instance, if the registry 125 lists users with login names JOE_DOE and JOHN_SMITH as being present in the given area, the routine 800 may assume that this information is accurate with a certain degree of probability. In order to assess this probability further, the system may compare the timestamps recorded for each operator's update and compare this timestamp with the current time to determine the likelihood that the operator or person is still within the control area.

If at least one operator (who otherwise has access rights to the notification) is believed to be in the relevant control area, the access control system will push the notification to this operator. Importantly, the routine 800 may refrain from sending non-emergency messages to operators who are either outside the relevant area or who are not associated with the particular functionality. However, if needed, it may be possible to dynamically expand the area of search for an operator by determining whether any qualified operators are currently believed to be in the areas adjacent to the control area in which the event was originated.

Referring again to FIG. 10, a block 805 of the routine 800 will queue the message corresponding to an event or an alarm. Queuing may be further subject to additional conditions, such as queue time expiration, maximum number of messages per area, etc. It may be necessary, for example, to sometimes extract a message from the message queue and page the operator directly if he or she is not in the proper area yet. In a typical scenario, however, the routine 800 will wait, in block 805, until one of the authorized operators enters the area or, in the case in which location updates are triggered manually, registers in the area. As discussed above, it may be necessary to check further authentication and restriction information of the operator at this point.

Finally, a block 807 pushes the message to the operator. At this point, the operator is believed to be in the control area from which the event has originated or most closely associated with the event. Using this technique increases the probability that the operator will handle the event in a timely manner, as this technique provides the event notification to the operator when the operator is in an area most closely associated with the event or provides the event notification to an operator that is currently in the area most closely associate with the event. Moreover, because the operator can preferably establish visual contact with the source of the potential or actual problem, the operator is much more likely to handle the event better.

The location based access control technique described with respect to FIGS. 1-10 may also be used to provide a higher degree of noise filtering. As one skilled in the art will immediately recognize, complex systems frequently report a high number of mostly minor events. Therefore, in addition to calculating the optimal time at which an event notification should be reported to mobile operators or the optimal operator to which an event notification should be sent, as illustrated in FIG. 10, the location based access control system described herein may reduce the noise by filtering out events that need not be delivered to all mobile operators. For example, if several operators normally receive similar alarms for the same module at their workstation or non-mobile locations, the location based access control system provides the ability to omit notifications to those mobile operators who are not likely to respond to the event at the given time due to their location. In this case, events may be withheld from a certain mobile operator based on the current location of the mobile operator.

It will be further appreciated that, while access to elements of the process control system 100 or 200 is normally granted only when a user carrying a portable device 180 is located within a particular or designated control area, there may be situations when this user needs additional access to other system elements. For example, there may arise emergency situations such that a user normally restricted to accessing devices within his or her proximity only may need to urgently access a remote device, such as a shutoff valve. In one embodiment, the process control system may detect these cases automatically and expand the area of access for a particular user or for all users in the system to encompass additional, remote areas or even all areas associated with the system in order to allow these users to deal with the emergency situation. In another embodiment, users may be provided with emergency override keys that allow them to gain access to elements that are normally inaccessible in the control area where they are currently located. Of course, the use of emergency keys might be closely monitored in this case in order to prevent abuse. For example, each use of the emergency override key and the information related to the specific user using the key may be recorded in the database 123 or logged by the data historian 135 for later analysis.

Specifically with respect to logging, it is also noted that the techniques discussed above provide several additional advantages such as associating events with locations as well as with users for real-time or post-time analysis. The data historian 135, for example, may log such acts as logging into or out of the process control system 100, adding or updating a setpoint or another operational value, clearing an alarm, etc. For each log entry, the data historian 135 may record the identity of the corresponding operator 170-172, the location of the operator 170-172 (e.g., absolute or relative coordinates, the identity of a wireless access point, the identity of a proximate device, etc), the time at which the event occurred, a description of the event, and other relevant information.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method of accessing an element in a process control environment using a portable communicator, comprising:
    defining, by one or more processors, one or more control areas within the process control environment, each of the one or more control areas being associated with one or more respective elements within a process control environment, the process control environment including a plurality of elements;
    determining, by one or more processors, a position of a user operating a portable communicator with respect to the one or more of the control areas;
    establishing, by one or more processors, an identity of the user and an organizational role of the user based on information entered via the portable communicator; and
    selectively allowing, by one or more processors, the user to access an element from among the plurality of elements within the process control environment via the portable communicator depending on (i) the determined position of the user with respect to the one or more control areas and (ii) the identity and the organizational role of the user,
    wherein a boundary of at least one of the one or more control areas is adjusted dynamically without user intervention according to conditions in the process control environment that are detected by a computing device, and
    wherein the dynamic adjustment results in a change in an association of one or more elements with at least one control area while the number of the plurality of elements in the process control environment remains unchanged.

2. The method of claim 1, wherein determining the position of a user operating the portable communicator includes associating the position of the user with a position of the portable communicator and determining the position of the portable communicator.

3. The method of claim 1, wherein determining the position of the user operating the portable communicator includes associating the position of the user with a position of an electronic tag carried by the user and determining the position of the electronic tag.

4. The method of claim 3, wherein determining the position of the electronic tag includes applying a technique consistent with a Real Time Location Systems (RTLS) standard to determine a real time position of the electronic tag.

5. The method of claim 3, wherein determining the position of the electronic tag includes activating a circuit within the electronic tag by means of a signal transmitted by a stationary element.

6. The method of claim 1, wherein selectively allowing the user to access an element within the process control environment includes selectively allowing the user to access data pertaining to the element but stored outside of the element depending on the determined position of the user with respect to the one or more control areas.

7. The method of claim 1, wherein selectively allowing the user to access an element within the process control environment includes selectively allowing the user to access configuration data pertaining to the element depending on the determined position of the user with respect to the one or more control areas.

8. The method of claim 7, wherein selectively allowing the user to access configuration data pertaining to the element includes allowing the user to change the configuration data.

9. The method of claim 1, wherein allowing the user to access an element within the process control environment includes selectively allowing the user to access data within the element when the user is determined to be within the same control area as the element.

10. The method of claim 1, wherein defining a plurality of control areas comprises associating each control area with a geographic area defined by a plurality of geographic coordinates.

11. The method of claim 10, wherein said geographic coordinates are Global Positioning Service coordinates.

12. The method of claim 1, wherein defining a one or more control areas comprises associating each of the one or more control areas with at least one area communicator and defining each of the one or more control areas as a geographic area in which a portable communicator may establish wireless communication with the at least one area communicator associated with the control area.

13. The method of claim 12, wherein defining each of the one or more control areas includes defining each of the one or more control areas as a geographical area in which a portable communicator may establish wireless communication with the at least one area communicator by detecting a search signal at or above a predetermined signal level, and
wherein the search signal is emitted from one of the portable communicator or the area communicator and detected by the other one of the portable communicator and the area communicator.

14. The method of claim 12, wherein associating each of the one or more control areas with the at least one area communicator includes assigning a radio frequency identification tag to the at least one area communicator.

15. The method of claim 12, wherein associating each of the one or more control areas with at least one area communicator includes using one of a wireless transmitter, a wireless receiver, or a wireless transceiver as the area communicator.

16. The method of claim 1, wherein determining the position of a user operating a portable communicator with respect to one or more of the control areas includes associating the position of the user with the position of the portable communicator, obtaining coordinates associated with a current location of the portable communicator, and determining whether the obtained coordinates are associated with one of the one or more control areas.

17. The method of claim 1, wherein determining the position of the user with respect to one or more of the control areas includes associating the position of the user with the position of the portable communicator and detecting, by the portable communicator, a search signal from each of one or more transceivers and measuring the strength of each of the received search signals.

18. The method of claim 1, wherein defining the one or more control areas within the process control environment includes placing at least one barcode tag within each of the one or more control areas, and
wherein determining the position of the user with respect to the one or more control areas includes associating the position of the user with a position of the portable communicator and scanning the barcode tag by the portable communicator.

19. The method of claim 1, wherein selectively allowing the user to access an element within the process control environment includes selectively allowing the user to access data regarding one of a field device, a controller, or a control loop within a process control system of the process control environment.

20. The method of claim 1, wherein allowing the user to access an element within the process control environment includes establishing a direct communication link between the portable communicator and the element.

21. The method of claim 1, wherein allowing the user to access an element within the process control environment includes establishing a communication link between the portable communicator and the element through a wireless network operatively coupled to the process control system.

22. The method of claim 1, wherein establishing an identity of the user includes obtaining identification information via the portable communicator, retrieving a record having data associated with the identification information of the user and permission levels of the user corresponding to one or more elements of the process control environment, and limiting access of the portable communicator to the element based on the data within the retrieved record.

23. The method of claim 1, further comprising:
selectively notifying, by one or more processors, the user via the portable communicator of an event associated with the element within the process control environment depending on the determined position of the user with respect to the one or more control areas, and
wherein the event includes data indicative of the element reporting one of an abnormal function, an abnormal measurement, or an emergency condition.

24. The method of claim 1, further comprising:
providing, by one or more processors, a notification via the portable communicator of an event associated with the element when the position of the user is determined to be within at least one of the control areas with which the event is associated, and not providing a notification to the user of an event associated with the element when the position of the user is determined to be outside of the one of the control areas with which the event is associated.

25. The method of claim 24, wherein the event includes data indicative of the element reporting one of an abnormal function, an abnormal measurement, or an emergency condition.

26. The method of claim 1, wherein establishing an identity of the user includes authorizing the user by obtaining a personal identification and a shared secret information from the user via the portable communicator.

27. The method of claim 1, wherein establishing an identity of the user includes obtaining personal identification data from the user using the portable communicator and reporting the position of the user and the personal identification data to a host disposed in a network associated with the process control environment, and
wherein the host is configured to display the position of the portable communicator and the identity of the user.

28. The method of claim 1, wherein selectively allowing the user to access an element within the process control environment further comprises:
obtaining an override key from via the portable communicator, determining whether the override key is valid in the process control environment, and granting access to the element irrespective of the determined position of the user if the override key is valid.

29. The method of claim 1, further comprising:
conditionally associating, by one or more processors, the position of the user with the position of the portable communicator, including:

associating the position of the user with a position of an electronic tag carried by the user;

establishing a wireless link between the electronic tag and the portable communicator having a signal strength; and disassociating the position of the user with the position of the portable communicator if the signal strength drops below a threshold value.

30. The method of claim 1, further comprising:

generating, by one or more processors, a log entry indicative of at least the determined position of the user and the identity of the user; and storing, by one or more processors, the log entry in a persistent memory.

31. The method of claim 30, wherein selectively allowing the user to access an element within the process control environment includes selectively allowing the user to update configuration data pertaining to the element depending on the determined position of the user with respect to the one or more control areas, and wherein generating the log entry includes generating the log entry further indicative of the update.

32. An access control system for use in a process control environment, the access control system comprising:

a computer readable medium; and a first routine stored on the computer readable medium which, when executed by a processor, determines the geographic position of an authorized user operating a portable communicator within the process control environment based on data received from one of the portable communicator or electronic location device carried by the authorized user;

a second routine stored on the computer readable medium which, when executed by a processor, limits access of the authorized user to data within the process control environment based on the determined geographic position of the portable communicator with respect to a plurality of control areas within the process control environment, each of the plurality of control areas being associated with one or more respective elements within the process control environment, the process control environment including a plurality of elements, wherein the boundary of at least one of the plurality of control areas is adjusted dynamically without user intervention according to conditions in the process plant that are detected by a computing device, the dynamic adjustment resulting in a change in an association of one or more elements with at least one control area while the number of the plurality of elements in the process control environment remains unchanged; and a third routine stored on the computer readable medium which, when executed by a processor, receives via the portable communicator, data indicative of information an identity of the user and an organizational role of the user and selectively allows the user to access an element from among the plurality of elements within the process control environment via the portable communicator depending on the identity and the organizational role of the user.

33. The access control system of claim 32, further comprising:

a fourth routine stored on the computer readable medium which, when executed by a processor, stores data indicative of the plurality of control areas.

34. The access control system of claim 33, wherein the third routine is stored in the portable communicator, and wherein the fourth routine is stored on a computer host communicatively coupled to a wireless communication network within the process control environment.

35. The access control system of claim 33, wherein the second routine and the fourth routine are stored on a computer host communicatively coupled to a wireless communication network within the process control environment.

36. The access control system of claim 33, wherein the fourth routine retrieves a user record from a database and further limits access of the authorized user to data within the process environment according to the user record and according to the data received by the fifth routine, and wherein the user record includes data associated with authorization information corresponding to the user and a permission level corresponding to the user to the element in the process control environment.

37. The access control system of claim 32, further including a fifth routine stored on the computer readable medium which, when executed by a processor, selectively notifies the portable communicator of an event associated with an element within the process control environment depending on the position of the portable communicator with respect to the plurality of control areas.

38. The access control system of claim 32, wherein the set of data received from the portable communicator includes a set of Global Positioning Service coordinates or data indicative of a search signal transmitted from a transceiver within the process environment.

39. The access control system of claim 32, further including a fifth routine stored on the computer readable medium which, when executed by a processor, records a time when the second routine determines the position of the user and the determined position of the user in a registry.

40. A method of accessing an element in a process control environment using a portable communicator, comprising:

defining a plurality of control areas within the process control environment;

determining a position of a user operating a portable communicator with respect to one or more of the control areas;

establishing an identity of the user and an organizational role of the user with information entered by the user via the portable communicator;

selectively allowing the user to access an element within the process control environment via the portable communicator depending on the determined position of the user with respect to the one or more control areas and on the identity of the user;

identifying whether the user is a target recipient of a notification of an event associated with the element within the process control environment according to the determined position of the user with respect to the one or more control areas, the identity of the user, and the organizational role of the user; and selectively pushing the notification to the portable communicator when the user is a target recipient and otherwise not pushing the notification to the portable communicator.

41. The method of claim 40, wherein defining a plurality of control areas comprises associating each of the plurality of control areas with at least one area communicator, and defining each control area as a geographic area in which the portable communicator may establish wireless communication with the at least one area communicator associated with the control area.

42. The method of claim 40, wherein determining the position of a user operating the portable communicator with respect to one or more of the control areas includes associating the position of the user with the position of the portable communicator, obtaining coordinates associated with a current location of the portable communicator, and determining whether the obtained coordinates are associated with one of the plurality of control areas.

43. The method of claim 40, wherein selectively allowing the user to access an element within the process control environment includes selectively allowing the user to access data regarding one of a field device, a controller or a control loop within a process control system of the process control environment.

44. The method of claim 40, wherein establishing an identity of the user includes obtaining identification information from the user using the portable communicator, retrieving a record having data associated with the identification information of the user and permission levels of the user to one or more elements of the process control environment, and limiting access of the portable communicator to the element based on the data within the retrieved record.

45. The method of claim 40, further comprising providing a notification to the user, via the portable communicator, of an event associated with the element when the position of the user is determined to be within at least one of the control areas with which the event is associated and not providing a notification to the user of an event associated with the element when the position of the user is determined to be outside of the one of the control areas with which the event is associated.

46. The method of claim 40, further comprising:
conditionally associating the position of the user with the position of the portable communicator, including:
associating the position of the user with a position of an electronic tag carried by the user;
establishing a wireless link between the electronic tag and the portable communicator having a signal strength; and
disassociating the position of the user with the position of the portable communicator if the signal strength drops below a threshold value.

47. The method of claim 40, further comprising:
generating a log entry indicative of at least the determined position of the user and the identity of the user; and
storing the log entry in a persistent memory.

48. An access control system for use in a process control environment, the access control system comprising:
a computer readable medium; and
a first routine stored on the computer readable medium which, when executed by a processor, determines the geographic position of an authorized user operating a portable communicator within the process control environment based on data received from one of the portable communicator or electronic location device carried by the authorized user;
a second routine stored on the computer readable medium which, when executed by a processor, limits access of the authorized user to data within the process control environment based on the determined geographic position of the portable communicator with respect to the plurality of control areas;
a third routine stored on the computer readable medium which, when executed by a processor, receives from a user of a portable communicator data indicative of an identity of the user and an organizational role of the user; and
a fourth routine stored on the computer readable medium which, when executed by a processor, identifies whether the portable communicator is a target recipient of a notification of an event associated with an element within the process control environment according to the position of the portable communicator with respect to the one or more control areas, the identity of the user and the organizational role of the user; and
a fifth routine stored on the computer readable medium which, when executed by a processor, selectively pushes the notification to the portable communicator when the portable communicator is a target recipient and otherwise does not push the notification to the portable communicator.

49. The access control system of claim 48, further comprising:
a sixth routine stored on the computer readable medium which, when executed by a processor, stores data indicative of a plurality of control areas.

50. The access control system of claim 49, wherein the sixth routine is stored in a portable communicator and the third routine is stored on a computer host communicatively coupled to a wireless communication network within the process control environment.

51. The access control system of claim 49, wherein the second routine and the sixth routine are stored on a computer host communicatively coupled to a wireless communication network within the process control environment.

52. The access control system of claim 48, wherein the second routine retrieves a user record from a database and further limits access of the authorized user to data within the process control environment according to the user record and to the data received by the second routine, and
wherein the user record includes data associated with an authorization information of the user and a permission level of the user to the element in the process control system.

53. The access control system of claim 48, wherein the set of data received from the portable communicator includes a set of Global Positioning Service coordinates or a data indicative of a search signal transmitted from a transceiver within the process control environment.

54. The access control system of claim 48, further including a sixth routine stored on the computer readable medium which, when executed by a processor, records in a registry (i) a time when the first routine determines the position of the user, and (ii) the determined position of the user.

* * * * *